(12) United States Patent
Skovgaard et al.

(10) Patent No.: US 7,327,922 B2
(45) Date of Patent: Feb. 5, 2008

(54) HERMETICALLY SEALED OPTICAL FIBRE WITH VOIDS OR HOLES, METHOD OF ITS PRODUCTION, AND ITS USE

(75) Inventors: Peter M. W. Skovgaard, Birkerod (DK); Jacob Rijs Folkenberg, Kokkedal (DK); Guillaume Vienne, Copenhagen V (DK)

(73) Assignee: Crystal Fibre A/S, Birkerod (DK)

( * ) Notice: Subject to any disclaimer, the term of this patent is extended or adjusted under 35 U.S.C. 154(b) by 161 days.

(21) Appl. No.: 10/492,171

(22) PCT Filed: Oct. 9, 2002

(86) PCT No.: PCT/DK02/00676

§ 371 (c)(1),
(2), (4) Date: Jul. 28, 2004

(87) PCT Pub. No.: WO03/032039

PCT Pub. Date: Apr. 17, 2003

(65) Prior Publication Data

US 2004/0247271 A1    Dec. 9, 2004

(30) Foreign Application Priority Data

Oct. 9, 2001 (DK) ............................. 2001 01489
Apr. 19, 2002 (DK) ............................. 2002 00592

(51) Int. Cl.
*G02B 6/032*        (2006.01)
(52) U.S. Cl. ............................................. 385/125
(58) Field of Classification Search .............. 385/39, 385/50, 126, 125
See application file for complete search history.

(56) References Cited

U.S. PATENT DOCUMENTS

| | | | |
|---|---|---|---|
| 3,902,879 A | | 9/1975 | Siegmund |
| 3,920,312 A | | 11/1975 | Siegmund |
| 5,757,993 A | * | 5/1998 | Abe ........................... 385/34 |

(Continued)

FOREIGN PATENT DOCUMENTS

WO    00/49435    8/2000

(Continued)

OTHER PUBLICATIONS

Furusawa, et al., "Cladding Pumped Ytterbium-doped Fiber Laser with Holey Inner and Outer Cladding," Optics Express, vol. 9, No. 13, pp. 714-720, 2001.

*Primary Examiner*—Michelle R. Connelly-Cushwa
(74) *Attorney, Agent, or Firm*—Jacobson Holman PLLC

(57) ABSTRACT

An optical fiber having an axial direction and a cross section perpendicular to said axial direction, said optical fiber comprising: a first light guiding fiber portion (604) having a cladding region with a plurality of spaced apart cladding voids extending longitudinally in the fiber axial direction and a core region bounded by said cladding region, and a solid light transparent fiber portion (602) having a first end facing the first light guiding fiber portion and a second end forming an end face of the optical fiber, said solid light transparent fiber portion providing a hermetic sealing (601) of the cladding voids of the first light guiding fiber portion; a method of its production, and its use, such as an optical fiber connector and an article comprising a microstructured optical fiber with hermetically sealed end face.

29 Claims, 21 Drawing Sheets

U.S. PATENT DOCUMENTS

| | | |
|---|---|---|
| 5,841,131 A | 11/1998 | Schroeder et al. |
| 6,105,514 A | 8/2000 | Liu |
| 6,301,421 B1 * | 10/2001 | Wickham et al. ............ 385/126 |
| 6,418,258 B1 * | 7/2002 | Wang ......................... 385/125 |
| 6,539,155 B1 | 3/2003 | Broeng et al. |
| 6,766,088 B2 * | 7/2004 | Hasegawa et al. ........... 385/123 |
| 2003/0165313 A1 | 9/2003 | Broeng et al. |
| 2004/0179796 A1 | 9/2004 | Jakobsen et al. |

FOREIGN PATENT DOCUMENTS

WO    WO 02/42814    *    5/2002

* cited by examiner

1001

1002  1003

HERMETICALLY SEALED OPTICAL FIBRE WITH VOIDS OR HOLES, METHOD OF ITS PRODUCTION, AND ITS USE

This is a nationalization of PCT/DK02/00676 filed Oct. 9, 2002 and published in English.

BACKGROUND OF THE INVENTION

The present invention relates to an optical fibre comprising a plurality of cladding voids, method of producing such a fibre, and use of such a fibre including articles comprising the fibre. More particularly, the present invention relates to an optical fibre having a hermetical sealing of the voids and a method for sealing said voids. By sealing the voids of the fibre according to the present invention the optical fibre may be prepared or optimised for being connected to an optical system, which may include optical fibres and other optical waveguides having optical properties different to the sealed void-containing fibre.

THE TECHNICAL FIELD

In recent years a new class of optical fibres has appeared. The optical guiding mechanism in these fibres is provided by introducing a number of air holes in the fibres. These holes typically run parallel with the fibre and extend all the way along the fibre length. The guiding principle can either be based on Total Internal Reflection (TIR) such as in traditional optical fibres, or the Photonic B and Gap (PBG) principle. For TIR-based fibres the core typically consists of solid glass, which has a larger refractive index than the effective refractive index of the surrounding cladding material, which includes a number of closely spaced holes. For PBG-based fibres the refractive index of the core can take any value, since the guiding is given by the fact that the light cannot propagate through the patterned cladding material. The cladding material would typically consist of carefully placed air holes with a predetermined hole size, distance and pattern.

Both types of fibres rely on air holes to give them their optical properties. In general, these types of fibres will in the following be called microstructured fibres. Fibres of this type are also known as microstructured optical fibres, holey fibres, photonic crystal fibres, photonic bandgap fibres, hole-assisted optical fibres, as well as other names may be used.

Many of the microstructured fibres that have recently been developed have characteristics quite dissimilar from conventional, solid glass optical fibres and thus find applications in a range of different fields. To increase the possibilities in which these special fibres can be used in such fields, coupling technologies are very important, both for coupling light between different fibres and for coupling light between microstructured fibres and a variety of optical components.

When connecting microstructured fibres to similar or other types of optical fibres as well as to other optical components there are several options. These include fusion splicing, free space optics and use of connectors.

Fusion splicing is in many aspects preferable since such a splice often can be made with high transmission, high mechanical stability and high mechanical strength. Furthermore, fusion splicing has the added advantage that the holes are sealed off from the surroundings so that contaminants such as dust particles, moisture and other chemicals cannot enter the holes. Also, since splicing usually involves melting the glass materials near the fibre interface a short time after cleaving the fibres, contamination at the interface is reduced and further contamination is hindered in the future.

As mentioned before, another option of coupling light between an optical fibre and e.g. a collimated or focusing beam is free space optics. By free space optics is meant situations where light is propagating in air and lenses are used to focus the light into the fibre or collect light from the fibre. In the case of coupling light from one fibre to the other, this method is typically used if the mode field diameters of the two fibres are too different to get a high transmission splicing. The transmission is given by the overlap integral between the two-modes. It can be seen that in the case of two very dissimilar mode field diameters (MFDs), much light will be lost in the coupling.

Also, free space optics is an option if splicing is not possible. This could be because the two fibres are made of different materials that cannot adhere or have very dissimilar melting points. Splicing can also be impossible if the structure of the microstructured fibre is such that it is too fragile or heat sensitive.

Also, many of the applications of this new class of fibres are in wavelength regions or technological fields where conventional fibre technologies are not normally used and splicing is therefore less needed. In all the above-mentioned cases, coupling by use of free space optics or simple butt coupling can be crucial for the use of these fibres.

In the case of free space optics one or more lenses are positioned accurately relative to the fibre facet. To make this system mechanically stable, the fibre end needs to be held firmly into place. This is typically done by inserting the fibre end into a ferrule whose outer diameter is comparable with the lens mount diameter and whose inner diameter is slightly larger than the fibre diameter to allow a snug fit. For conventional, solid fibres, the fibre is typically glued, soldered or welded into the ferrule. Typically, an extra length of fibre is pushed through the ferrule and subsequently polished to remove any excess glue and to make sure the fibre end is flat and in plane with the ferrule end. The ferrule can then be permanently fixed relatively to the lens system (e.g. standard collimators).

Yet another option of coupling light to and from a fibre is to use connectors such as e.g. the PC or APC connector. In making a connector at the end of the fibre, the fibre end is again inserted into the connector ferrule and the fibre end is polished into plane with the connector ferrule end. This connector can then be used together with connectorised optical equipment, in fibre-to-fibre connectors or be used for general mounting purposes.

Mounting a connector at the end of a microstructured fibre and maintaining the fibre end in such system is difficult. For the mounting, one need to be very careful that neither glue nor chemicals enter the holes during the mounting process (e.g. into ferrules), since the capillary effect can pull these contaminants further up into the holes. If liquid enter the holes, the light guiding properties will be dramatically altered or destroyed. Also, polishing the fibre end is often impossible, since material can enter the holes, and since the fibre might be too fragile to make polishing feasible. For traditional fibre maintenance, cleaning the fibre end is typically done with lens tissue soaked in a liquid chemical such as acetone, methanol or iso propanol alcohol (IPA) or by other means where some cleaning material such as cloth or lens tissue is touching the facet. For microstructured fibres, none of this is possible, since material might enter the holes.

Even trying to blow away dust from the end facet using pressurised air might damage the hole structure near the facet.

The effect of accumulation of contaminants or damage the hole structure near the exposed fibre facets can be that optical transmission is reduced, reflections at the facet (return loss) can increase and beam steering can occur. Also, contamination at the fibre facets can be a serious problem when coupling high optical power in and out of the optical fibre, since the contaminants can either evaporate and leak into the holes or burn onto the facet. In both cases, permanent damage or degradation can be the result.

Therefore, there is a need for a method of treating the facet of fibres with voids or holes, such that the end is mechanically and chemically robust and can be treated much the same way as traditional, solid glass optical fibres. Furthermore, there is a need for such a treated optical fibre, a method of its production, and its used within various articles.

DISCLOSURE OF THE INVENTION

Object of the Invention

It is an object of the present invention to provide microstructured optical fibres with fibre ends that are accessible in manners as substantially known from standard (solid) optical fibres, such as fibre ends that may for example be polished, connectorized, and cleaned using various chemicals, as well as methods for providing such fibre ends and use of fibres with such ends. In particular, it is an object of the present invention, to provide microstructured optical fibres with fibre ends that have eliminated many potential problems related to contamination of the hole or void structure and to mechanical instability of the fibres ends. It is a further object of the present invention to provide microstructured optical fibres that may handle high power levels, methods of producing such optical fibres, and their use.

Further objects appear from the description elsewhere.

Solution According to the Invention

According to the present invention, these objects are fulfilled by providing an optical fibre having an axial direction and a cross section perpendicular to said axial direction, said optical fibre comprising: a first light guiding fibre portion having a cladding region with a plurality of spaced apart cladding voids extending longitudinally in the fibre axial direction and a core region bounded by said cladding region, and a solid light transparent fibre portion having a first end facing the first light guiding fibre portion and a second end forming an end face of the optical fibre, said solid light transparent fibre portion providing a hermetic sealing of the cladding voids of the first light guiding fibre portion.

Alternatively worded, there is provided an optical fibre having an axial direction and a cross section perpendicular to said axial direction, said optical fibre comprising:

(a) a first portion comprising a light guiding fibre and a first portion end, said light guiding fibre having a cladding region with a plurality of spaced apart cladding voids extending longitudinally in the fibre axial direction, and having a core region bound by said cladding region, and (b) a second portion comprising a solid light transparent fibre, said solid light transparent fibre having a first end and a second end, said first end facing said first portion end of said first portion and said second end forming an end face of the optical fibre, wherein said solid light transparent fibre of said second portion provides a hermetic sealing of said cladding voids, and optionally any core voids in said core region, of said first portion end of the optical fibre.

It is to be understood that by the wording 'facing' is meant the ends are contactingly facing each other, such as attached to each other, such as covering each other, such as sharing a common solid background material covering the holes or voids. It is also to be understood that the two respective ends (first end and first portion end, i.e. end of microstructured fibre portion and end of solid fibre portion) may originate from within the same (single) optical fibre prior to its treatment (where the claimed optical fibre is the optical fibre after treatment) or that the two ends may belong to two different optical fibres (one of these optical fibres being solid) prior to treatment, where the two optical fibres are attached to each other to form one optical fibre being the claimed optical fibre.

Here, the first light guiding fibre portion may have a Mode Field Diameter, MFD. This MFD of the first fibre portion may define a first optical field diameter of light at the first end of the solid fibre portion when light is transmitted from the first light guiding fibre portion to the solid fibre portion, and the transmitted light has a second optical field diameter when reaching the second end of the solid fibre portion. The solid fibre portion may be dimensioned so that the second optical field diameter is larger than the first optical field diameter. Preferably, the solid fibre portion may be dimensioned so that the second optical field diameter is smaller than or equal to the cross-sectional diameter or smallest cross-sectional dimension of the second end of the solid fibre portion.

According to the present invention, the outer dimensions of the solid fibre portion may vary, but it is preferred that the cross sectional dimension of the second end of the solid fibre portion is smaller than or equal to the largest cross-sectional dimension of the first fibre portion.

The length of the solid fibre portion may also vary and may for example be optimised as a function of the MFD of the first fibre portion and the wavelength of the guided light. However, it is preferred that the solid fibre portion is smaller than or equal to 2 mm in length from the first end to the second end, such as smaller than or equal to 1 mm, such as smaller than or equal to 0.5 mm, such as smaller than or equal to 0.2 mm, such as smaller than or equal to 0.1 mm, such as smaller than or equal to 0.05 mm, or such as smaller than or equal to 0.02 mm in length from the first end to the second end.

It is preferred that the core region of the first fibre portion is solid. It is also preferred that the core material of the first fibre portion has a refractive index being larger than an effective refractive index of the cladding region for a guided wavelength of light in the range of 400-1700 nm.

It is also within embodiments of the present invention that the core region of the first fibre portion comprises one core void or a plurality of spaced apart core voids extending longitudinally in the fibre axial direction, and wherein the core void(s) are hermetically sealed by the solid light transparent fibre portion. Here, the core region of the first fibre portion may have an effective refractive index being larger than an effective refractive index of the cladding region for a guided wavelength of light in the range of 400-1700 nm. Alternatively, the core region of the first fibre portion may have an effective refractive index being smaller than an effective refractive index of the cladding region for a guided wavelength of light in the range of 400-1700 nm.

The present invention also covers embodiments in which the cladding voids are periodically arranged within the cladding region.

According to a preferred embodiment, the cladding voids are arranged in a cladding material, and the cladding material may have a refractive index being larger than a refractive index of the cladding voids. It is preferred that the cladding voids contain air, another gas or vacuum. Here, the cladding voids may be air holes or capillary air holes. Similarly, it is also preferred that the core voids contain air, another gas or vacuum, and the core voids may be air holes or capillary air holes.

Different materials may be used for the first fibre portion, but it is preferred that the material defining the core region and/or the cladding region is made of glass, or that the material defining the core region and/or the cladding region comprises silica.

When having voids or holes in the cladding region, the cladding region of the first fibre portion may have an effective refractive index being a function of the wavelength of the guided light, and the solid fibre portion may also have an effective refractive index. Here, it is preferred that the effective refractive index of the solid fibre region is larger than the effective refractive index of the cladding region of the first fibre region for a guided wavelength of light in the range of 400-1700 nm.

It should be understood that according to the present invention, a hermetic sealing of the voids of the first fibre portion can be obtained in several ways. According to an embodiment of the invention a hermetic sealed solid fibre portion may be made by filling the voids of an end fibre portion with a hermetically sealing filling material. Here, the filling material may be transparent, and it is preferred that the filling material is a liquid, which can be hardened or cured. Different materials may be selected for the filling materials, and the filling material may be selected from a list including Sol-Gel, Spin-on glass, liquid glass, polymer, glue, index matching gel, Colloid-Polymer Mixture and a polymeric suspension of $SiO_2$ (Silicon-tetra-acetate $Si(CH_2COOH)_4$) dissolved in a suitable solvent.

When the filling material is a liquid, which can be cured, different methods may be used or for curing the filling material. These methods may include use of heat, use of UV light exposure, use of electron beam exposure, use of moisture exposure, use of anaerobic reaction, and use of anionic reaction. The filling material may also be a two-component solution that may be cured through chemical activation.

When the filling material is a liquid, the liquid may penetrate a distance into the voids by using capillary effects. The penetration distance can be controlled by methods known in the art, e.g. by adjusting the viscosity of the liquid by adjusting temperature and/or adding viscosity modifying agents to the liquid such as surfactants. Also, the surface of the voids or holes may be pre-treated by wetting agents, such as silanes, to affect their interaction with the liquid.

It is preferred that the filling material of the voids has a refractive index being smaller than or equal to the refractive index of the cladding material surrounding the cladding voids and being larger than the refractive index of the cladding voids. It is also preferred that the fibre portion having voids filled with the filling material has a cleaved end forming the end face of the optical fibre. Here, the fibre portion having voids filled with the filling material may be cleaved so that the solid fibre portion has a predetermined length.

It is also within embodiments of the present invention that the hermetic sealing solid fibre portion is a piece of glass or silica rod. The glass or silica rod may be made of a homogeneous material. Here, the material forming the glass or silica rod may have a refractive index being larger than the effective refractive index of the cladding region for a guided wavelength of light in the range of 400-1700 nm.

The present invention also covers embodiments in which the solid fibre portion comprises a piece of optical fibre with a light guiding core.

According to further embodiments of the present invention, the solid fibre portion may comprise a piece of optical fibre with a graded refractive index profile. Here, the solid fibre portion may comprise a piece of optical fibre with a graded refractive index profile adapted to collect, collimate or focus light to and from the first optical fibre region.

When the solid fibre portion comprises an optical fibre, the optical fibre of the solid fibre portion may have a Mode Field Diameter (MFD) being substantially equal to the MFD of the first fibre portion. However, it is also within the present invention that the optical fibre of the solid fibre portion may have an expanding Mode Field Diameter (MFD), which is larger at the second end than at the first end of the solid fibre portion, or that the optical fibre of the solid fibre portion may have a tapered Mode Field Diameter (MFD), which is smaller at the second end than at the first end of the solid fibre portion. It is preferred that the MFD of the optical fibre of the solid fibre portion is substantially equal to the MFD of the first fibre portion at the first end of the solid fibre portion.

When the solid fibre portion comprises an optical fibre, it is preferred that the optical fibre of the solid fibre portion is spliced to the first fibre portion. Here, the optical fibre of the solid fibre portion may be fusion spliced to the first fibre portion. It is also preferred that the optical fibre of solid fibre portion has a cleaved end forming the end face of the optical fibre. The cleaving may be performed so that the solid fibre portion has obtained a predetermined length.

The present invention also covers embodiments in which the hermetic sealing solid fibre portion has been formed by heating an end fibre portion so as to collapse or close the voids within said end portion. Here, the cross sectional dimension of the second end of the solid fibre portion may be smaller than the largest cross-sectional dimension of the first fibre portion. It is preferred that the end fibre portion has been cleaved before said heating process, whereby the end face of the formed solid fibre portion may have obtained an outwardly curving surface during said heating process, and it is also preferred that the heating process has been performed so as to obtain a predetermined length of the solid fibre portion.

Alternatively, the end fibre portion forming the solid fibre portion may have been cleaved after said heating process, whereby the end face of the formed solid fibre portion may have obtained a substantially flat surface. Also here, the formed solid fibre portion may have been cleaved so that the solid fibre portion has a predetermined length.

It is preferred that the when heating the end fibre portion to obtain said solid fibre portion, the solid fibre portion is formed using a laser. Such as laser may be a $CO_2$ laser. However, other heating sources may be used such as a tungsten filament heat source.

The optical fibre of the present invention may be used of form an optical connector. Thus, according to a second aspect of the present invention, there is provided an optical fibre connector comprising a ferrule surrounding all or at least part of the solid light transparent fibre portion of an optical fibre selected from the optical fibres of the first aspect of the invention.

According to the first aspect of the invention, there is also provided a method of sealing a first light guiding optical fibre portion having a cladding region with a plurality of spaced apart cladding voids extending longitudinally in the fibre axial direction and a core region bounded by said cladding region, said method comprising the steps of: forming or arranging a solid light transparent fibre portion at the end of the first light guiding fibre portion so as to provide a hermetic sealing of said cladding voids.

Here, the solid light transparent fibre portion may have a first end facing the first light guiding fibre portion and a second end opposite said first light guiding fibre portion, and the solid fibre portion may be arranged so that when light is transmitted from the first light guiding fibre portion to the solid fibre portion, the light is entering the solid fibre portion via the first end and leaving the solid fibre portion via the second end. The first light guiding fibre portion may have a Mode Field Diameter, MFD, defining a first optical field diameter of light at the first end of the solid fibre portion when light is transmitted from the first light guiding fibre portion to the solid fibre portion, and the transmitted light may have a second optical field diameter when reaching the second end of the solid fibre portion. Also here it is preferred that the solid fibre portion is dimensioned so that the second optical field diameter is larger than the first optical field diameter. It is also within an embodiment of the invention that the solid fibre portion is dimensioned so that the second optical field diameter is smaller than or equal to the cross-sectional diameter or smallest cross-sectional dimension of the second end of the solid fibre portion.

Again, it is preferred that the solid fibre portion is dimensioned so that the cross sectional dimension of the second end of the solid fibre portion is smaller than or equal to the largest cross-sectional dimension of the first fibre portion. Also for the method of the present invention it is preferred that the solid fibre portion is smaller than or equal to 2 mm in length from the first end to the second end, such as smaller than or equal to 1 mm, such as smaller than or equal to 0.5 mm, such as smaller than or equal to 0.1 mm, such as smaller than or equal to 0.05 mm, or such as smaller than or equal to 0.02 mm in length from the first end to the second end.

The core region of the first fibre portion may be solid, and it is preferred that the core material of the first fibre portion has a refractive index being larger than an effective refractive index of the cladding region for a guided wavelength of light in the range of 400-1700 nm.

The method of the invention also covers embodiments, wherein the core region of the first fibre portion comprises one core void or a plurality of spaced apart core voids extending longitudinally in the fibre axial direction, said method further comprising hermetically sealing the core void(s) by the formation or arrangement of the solid light transparent fibre portion. Here, the core region of the first fibre portion may have an effective refractive index being larger than an effective refractive index of the cladding region for a guided wavelength of light in the range of 400-1700 nm. Alternatively, the core region of the first fibre portion may have an effective refractive index being smaller than an effective refractive index of the cladding region for a guided wavelength of light in the range of 400-1700 nm.

The method of the invention also covers embodiments, wherein the cladding voids are periodically arranged within the cladding region.

According to a preferred embodiment of the method of the invention, the cladding voids are arranged in a cladding material, and the cladding material may have a refractive index being larger than a refractive index of the cladding voids. It is preferred that the cladding voids contain air, another gas or vacuum. Here, the cladding voids may be air holes or capillary air holes. It is also preferred that the core voids contain air, another gas or vacuum, and the core voids may be air holes or capillary air holes.

Also for the method of the invention different materials may be used for the first fibre portion, but it is preferred that the material defining the core region and/or the cladding region is made of glass, or that the material defining the core region and/or the cladding region comprises silica.

It is also within embodiments of the method of the invention that the cladding region of the first fibre portion may have an effective refractive index and the solid fibre portion may have an effective refractive index, with the effective refractive index of the solid fibre region being larger than the effective refractive index of the cladding region of the first fibre region for a guided wavelength of light in the range of 400-1700 nm.

It has already been discussed that the hermetic sealing of the voids of the first fibre portion can be obtained in several ways. Thus, it is also within embodiments of the method of the invention that the formation of the hermetic sealing solid fibre portion may comprise filling the voids of an end fibre portion of the first light guiding fibre portion with a hermetically sealing filling material. Here, the filling material may be transparent, and it is preferred that the filling material is a liquid, which can be hardened or cured. Again, different materials may be selected for the filling materials, and the filling material may be selected from a list including Sol-Gel, Spin-on glass, liquid glass, polymer, glue, index matching gel, Colloid-Polymer Mixture and a polymeric suspension of $SiO_2$ (Silicon-tetra-acetate $Si(CH_2COOH)_4$) dissolved in a suitable solvent. When the filling material is a liquid, which can be cured, different methods may be used or for curing the filling material. Thus, the filling material may for example be cured by use of heat, by use of UV light exposure, by use of electron beam exposure, by use of moisture exposure, by use of anaerobic reaction, or by use of anionic reaction. The filling material may also be a two component solution which may be cured through chemical activation. When the filling material is a liquid, the liquid may penetrate a distance into the voids by use of capillary effects.

Also here is it preferred that the filling material of the voids has a refractive index being smaller than or equal to the refractive index of the cladding material surrounding the cladding voids and being larger than the refractive index of the cladding voids. It is preferred that the method further comprises the step of cleaving the formed solid fibre portion to thereby obtain a cleaved end of the solid fibre portion. Here, the formed solid fibre portion may be cleaved so that the solid fibre portion has a predetermined length.

The method of the invention also comprises embodiments, wherein the solid fibre portion is formed by fastening or splicing a piece of glass or silica rod to an end part or end surface of the first light guiding fibre portion. The glass or silica rod may be made of a homogeneous material. It is preferred that the material forming the glass or silica rod has a refractive index being larger than the effective refractive index of the cladding region for a guided wavelength of light in the range of 400-1700 nm.

The method of the invention also comprises embodiments, wherein the arranged solid fibre portion comprises a piece of optical fibre with a light guiding core.

It is also within embodiments of the method of the invention that the arranged solid fibre portion comprises a piece of optical fibre with a graded refractive index profile. Here, the arranged solid fibre portion may comprise a piece optical of fibre with a graded refractive index profile adapted to collect, collimate or focus light to and from the first optical fibre region.

Also here, the optical fibre of the solid fibre portion may have a Mode Field Diameter (MFD) being substantially equal to the MFD of the first fibre portion. However, it is also within embodiments of the method of the invention that the optical fibre of the solid fibre portion may have an expanding Mode Field Diameter (MFD), which is larger at the second end than at the first end of the solid fibre portion, or that the optical fibre of the solid fibre portion may have a tapered Mode Field Diameter (MFD), which is smaller at the second end than at the first end of the solid fibre portion. Again, it is preferred that the MFD of the optical fibre of the solid fibre portion is substantially equal to the MFD of the first fibre portion at the first end of the solid fibre portion.

When the solid fibre portion comprises an optical fibre, it is preferred that the method further comprises the step of splicing the optical fibre of the solid fibre portion to the first fibre portion. Here, the splicing process may comprise a fusion splicing. It is also preferred that the method of the invention further comprises the step of cleaving the solid fibre portion to thereby obtain a cleaved end of the solid fibre portion. Here, the solid fibre portion may be cleaved so as to obtain a predetermined length.

The method of the invention further comprises embodiments, wherein the solid fibre portion is formed by heating an end portion of the first light guiding fibre portion so as to collapse or close the voids within said end portion to thereby obtain a hermetic sealing of said voids. Here, the cross sectional dimension of the second end of the solid fibre portion may be smaller than the largest cross-sectional dimension of the first fibre portion. It is preferred that the end portion of the first fibre portion is cleaved before said heating process, whereby the end face of the formed solid fibre portion obtains an outwardly curving surface during said heating process. Preferably, the heating process is performed so that the resulting solid fibre portion has a predetermined length.

Alternatively, the solid fibre portion may be cleaved after being formed during said heating process, whereby the end face of the formed solid fibre portion may have a substantially flat surface. Preferably, the formed solid fibre portion is cleaved so that the solid fibre portion has a predetermined length.

Also here it is preferred that to use a laser for the heating of the end portion to thereby form the solid fibre portion. Again, such a laser may be a $CO_2$ laser. However, other heating sources such as a tungsten filament heat source may be used.

Other objects, features and advantages of the present invention will be more readily apparent from the detailed description of the preferred embodiments set forth below, taken in conjunction with the accompanying drawings.

Definition of Terms and Expressions

In this application there is made a distinction between the term "refractive index" and the term "effective refractive index". The refractive index is the conventional refractive index of a homogeneous material. For the optical fibre of the present invention the most important optical wavelengths are wavelengths in the visible to near-infrared regime (wavelengths from approximately 400 nm to 2 mm). In this wavelength range most relevant materials for fibre production (e.g. silica) may be considered mainly wavelength independent, or at least not strongly wavelength dependent. However, for non-homogeneous materials, such as fibres with voids or air holes, the effective refractive index may be very dependent on the morphology of the material. Furthermore, the effective refractive index of such a fibre may be strongly wavelength dependent. The procedure of determining the effective refractive index at a given wavelength of a given fibre structure having voids or holes is well-known to those skilled in the art (see e.g. Jouannopoulos et al, "Photonic Crystals", Princeton University Press, 1995 or Broeng et al, Optical Fiber Technology, Vol. 5, pp. 305-330, 1999).

As appreciated within the field of microstructured fibres, the term "air holes" of the cladding and/or in the core may include holes or voids comprising a vacuum, gas or liquid, said holes or voids being fully or partly filled with a liquid or a gas after production of the microstructured optical fibre.

BRIEF DESCRIPTION OF THE DRAWINGS

In the following, by way of examples only, the invention is further disclosed with detailed description of preferred embodiments. Reference is made to the drawings in which.

DETAILED DESCRIPTION

Figure 1:
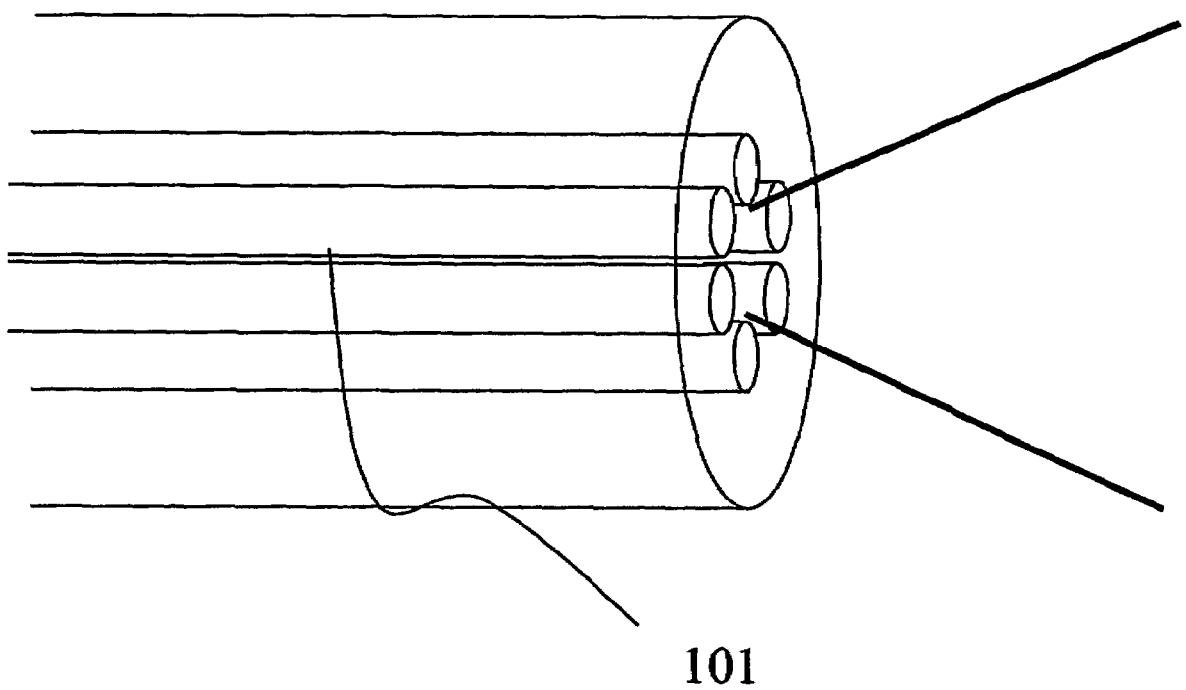
FIG. 1 shows schematically the end face of a microstructured fibre after cleaving. The expanding light out of the fibre can be seen. The exposed holes can also be seen.

FIG. 1 schematically shows the end face of a prior art microstructured fibre after cleaving. The expanding light out of the fibre can be seen, as well as the exposed holes 101. It is a disadvantage in the prior art that a microstructured fibre as shown in FIG. 1 is susceptible to various types of pollution and contamination that may enter into the holes or voids 101. Pollution or contamination may, for example, be water or other liquid that through capillary effects may be sucked into the holes or voids. This will typically alter the waveguiding characteristics of the microstructured optical fiber over some or all of its length and, thereby, degrade its performance. Hence, it is desired to provide microstructured optical fibre that eliminates the risk and exposure to pollution and contamination through open holes or voids at an end face.

The types of problems related to pollution or contamination entering into an optical fibre are not experienced in standard optical fibre technology, where solid optical fibres are employed. The problems are, therefore, unique to optical fibres comprising holes or voids, specifically microstructured optical fibres, and require development of unique optical fibre solutions and methods for solving these problems. Such optical fibre solution and methods would greatly increase the deployment of microstructured optical fibres and opened up or greatly improve their use.

Figure 2:
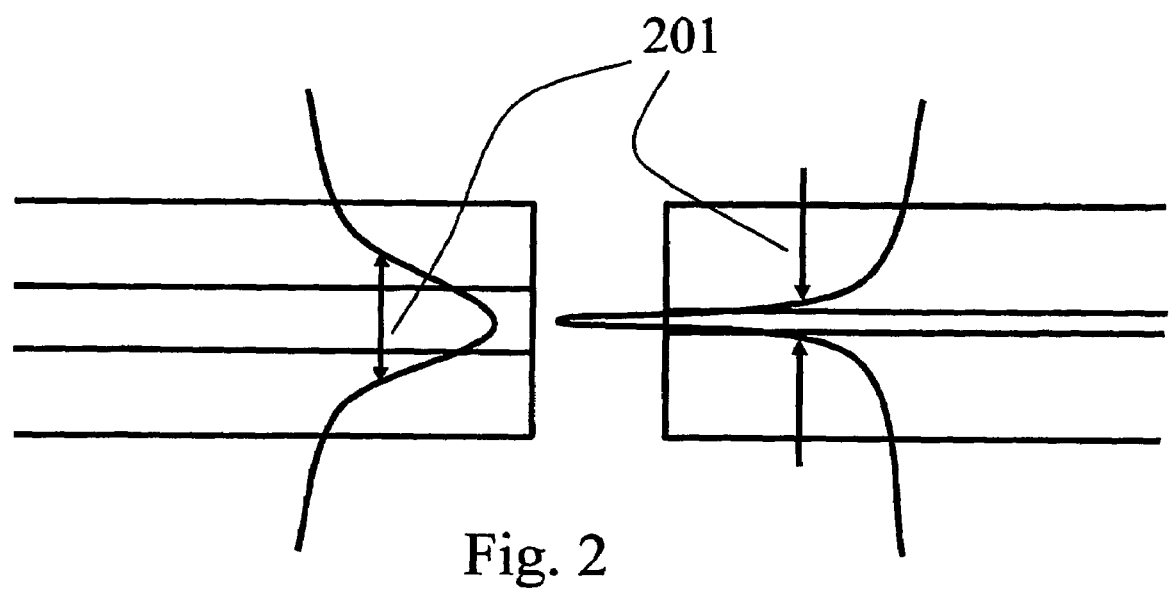
FIG. 2 shows schematically the cleaved ends of two fibres with very dissimilar mode field diameters (MFDs). A sketch of the MFD can be seen.
Figure 3:
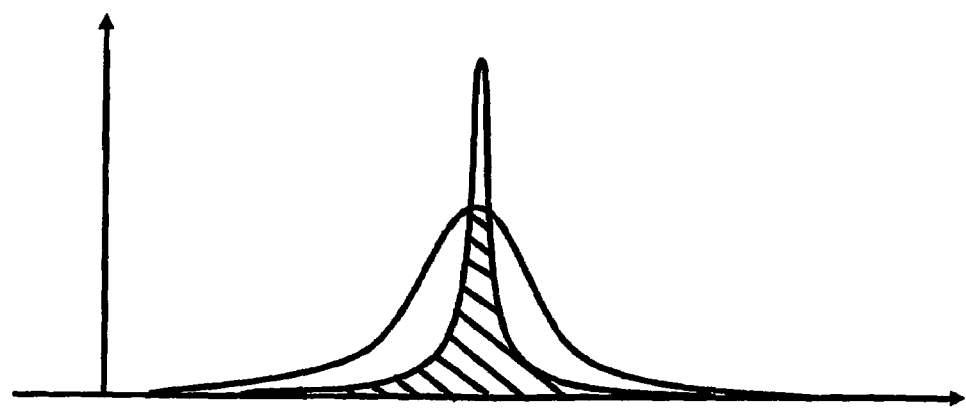
FIG. 3 shows schematically the theoretically best-case transmission one can obtain by splicing two fibres together with very dissimilar mode field diameters (MFDs).

FIG. 2 shows schematically the cleaved ends of two fibres with very dissimilar mode field diameters (MFDs). One or both optical fibres may be a microstructured fibre. A sketch of the MFD can be seen as indicated by numeral 201. FIG. 3 shows schematically the theoretically best-case transmission one can obtain by splicing two fibres together with very dissimilar mode field diameters (MFDs)—as illustrated by the shaded area. Microstructured optical fibres are very flexible with respect to MFD that may be obtained, such that microstructured optical fibres may be designed to have smaller, larger or similar MFD compared to standard optical fibres. Therefore, for coupling of light between microstructured fibres themselves, between microstructured fibres and standard fibres, other optical components, free-space optics, or simply to free-space, there is a need to developed methods and connectors that may handle microstructured fibres with such a variety of MFDs while eliminating pollution or contamination of the fibres through holes or voids in their end face. As an example, it is desired to develop microstructured fibres with connectors in one or both ends, where the connectors may for example be a collimator or a PC- or APC-type of connector that allows handling of the microstructured fibres in manners that are familiar within standard optical fibre technology.

As stated before, there is a need for a method of making the facet of a microstructured fibre end mechanically and chemically robust, such that this end can be treated much the same way as traditional, solid optical fibres.

Figure 4A:
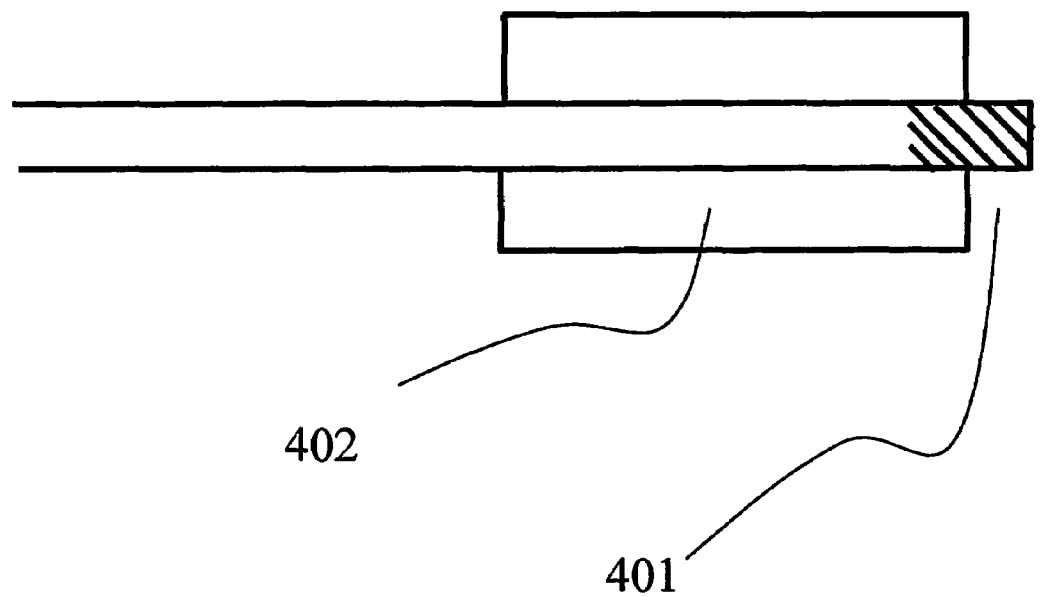
FIGS. 4 a and b shows schematically how a sealed fibre end is inserted into a ferrule (FIG. 4a) and an extruding end polished down to be in plane with the ferrule end (FIG. 4b).
Figure 4B:
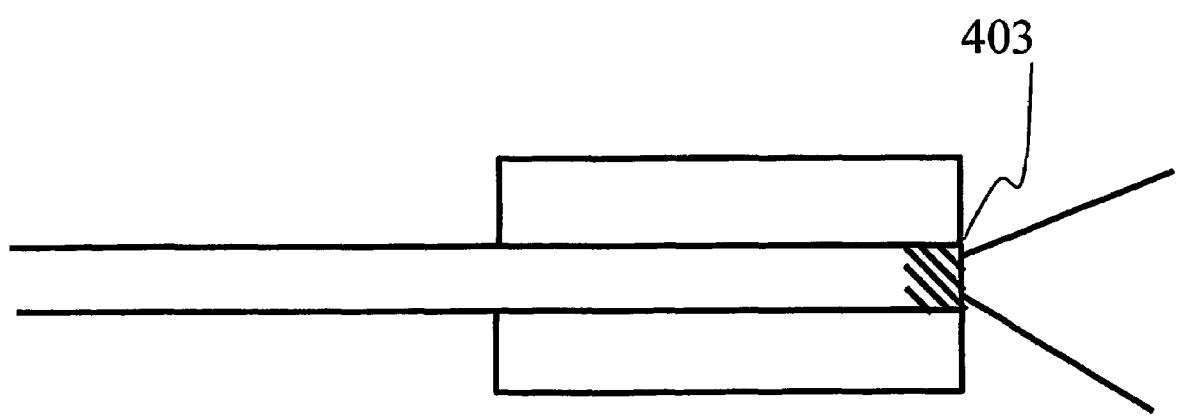
Figure 5:
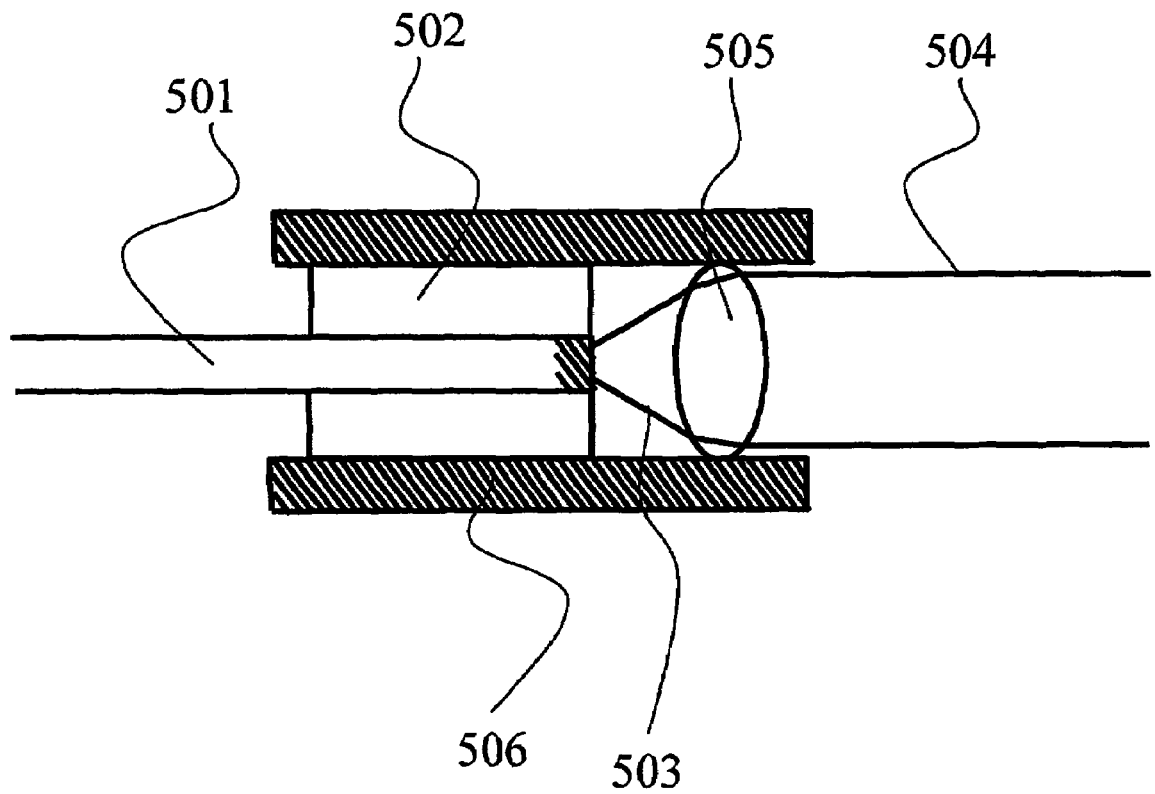
FIG. 5 shows schematically an example of a fibre collimator where a sealed microstructured fibre inside a ferrule is used. The diverging light beam is collected and collimated by a lens.

The treated region corresponds to the shaded region 401 in FIG. 4. An example of this is the mounting of microstructured fibres into a ferrule 402. It is desired to provide methods of treating an end of the microstructured fibre such that this end behaves comparable with traditional fibres in terms of mechanical robustness and eliminated risk of pollution/contamination. Thereby, for example, allowing for mounting performed as schematically shown in FIG. 4 and FIG. 5. FIG. 4 shows schematically an article according to a preferred embodiment of the present invention comprising a microstructured optical fibre having hermetically sealed end face and a ferrule. In FIG. 4 an extra length of microstructured optical fibre 401 is pushed through the ferrule 402 and subsequently polished to remove any excess glue and to make sure that the fibre end 403 is flat and in plane with the ferrule end. The ferrule may be permanently fixed relatively to a lens system (e.g. standard collimators)—as shown schematically in FIG. 5 for a further preferred embodiment of the present invention. FIG. 5 shows an exemplary fibre collimator according to a preferred embodiment of the present invention. The collimator comprises a sealed microstructured fibre 501 inside a ferrule 502. The diverging light beam 503 is collected and collimated 504 by a lens 505. For typical collimators, the ferrule 502 and lens 505 are mounted within a steel tube 506. Typical dimensions are: Ferrule length: ~5 mm, ferrule outer diameter: ~2 mm, lens diameter ~2 mm, beam width: 1.8 mm, total collimator length: ~20 mm, total collimator diameter: ~3.5 mm. The collimating lens could also be a Graded Index (GRIN) lens that has flat facets.

Figure 6:
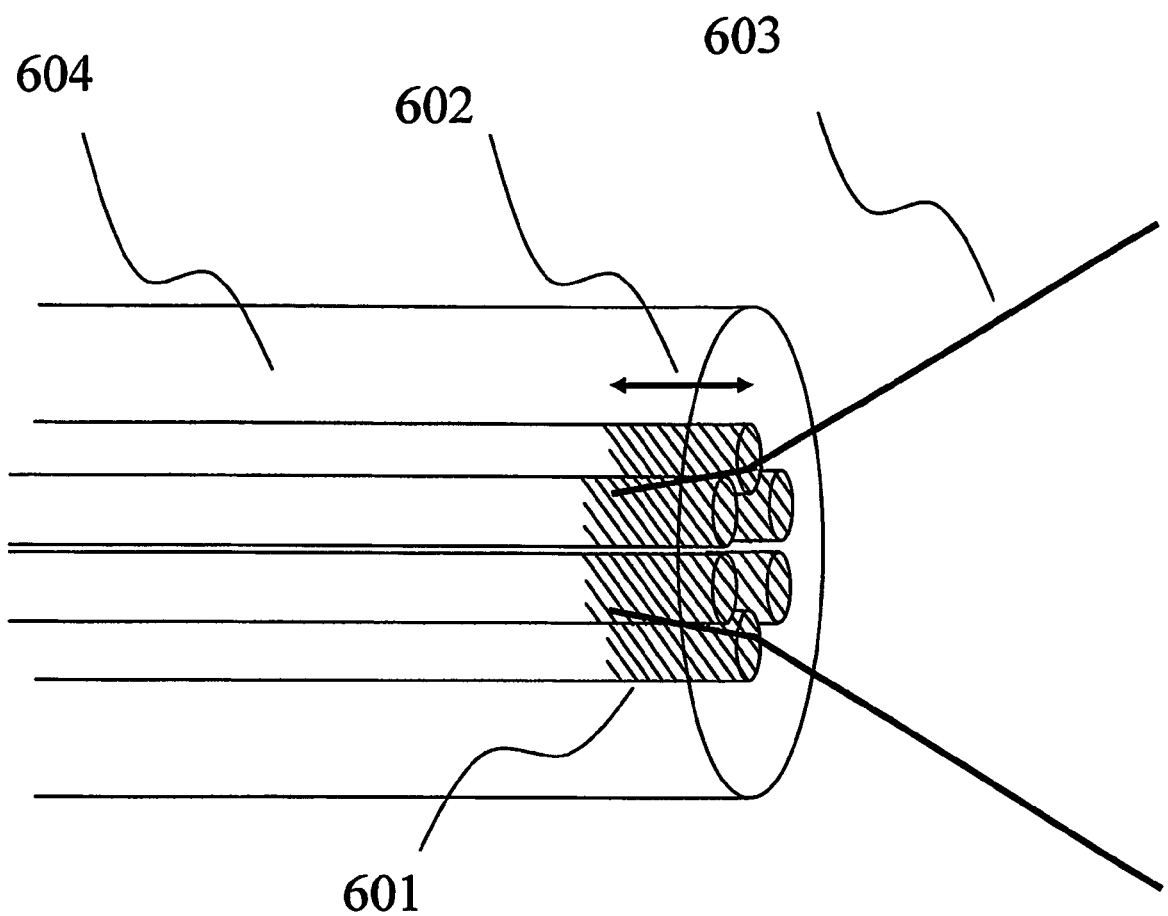
FIG. 6 shows schematically the end face of a microstructured fibre after the cleave facet has been dipped in a transparent liquid that can be cured or hardened. This liquid can be seen a distance up into the holes. The expanding light can be seen exiting the fibre.

One method according to a preferred embodiment of the present invention of achieving a hermetically sealed end face is to treat the microstructured optical fibre end after the cleaving but before the mounting by inserting the microstructured fibre end into a solution of a liquid, which can be hardened or cured for a predetermined time (see FIG. 6). The hardened or cured liquid material 601 may preferably be transparent and have a refractive index smaller than or equal to the surrounding glass material to avoid creating new optical cores. In preferred embodiments of the invention, the hardened or cured liquid material has a smaller refractive index than the surrounding glass material, such that the optical characteristics of the microstructured optical fibre are largely unchanged all the way through the fibre to its end face. In other preferred embodiments, the hardened or cured liquid material has a substantially similar refractive index to the surrounding glass material, such that the MFD of the microstructured optical fibre is expanded at its end face compared to the MFD at the portion of microstructured fibre that does not comprise hardened or cured liquid material. There is a wide range of choices in choosing the liquid. To mention a few, consider Sol-Gel, Spin-on glass, liquid glass, glue, polymer, resin, Benzocyclobutene (BCB), index matching gel, Colloid-Polymer Mixture or a polymeric suspension of SiO2 (Silicon-tetra-acetate Si(CH2COOH)4) dissolved in a suitable solvent.

The capillary effect would pull the liquid up into the holes a certain distance given by the hole size, surface tension, immersion time and liquid viscosity. The fibre end could subsequently be cleaved or polished (see FIG. 6) so that only a short distance 602 of the fibre is filled with material. FIG. 6 shows further a first light guiding fibre portion 604 having cladding region with plurality of spaced apart cladding voids extending longitudinally in the fibre axial direction.

Using this method a region is made, where the optical guiding may be lost or reduced. In one case where the refractive index of the material is equal to that of the glass, the guiding mechanism can be completely lost. In that case this region acts as an optical window in which the light 603 to or from the fibre will propagate according to propagation of light beams in a homogeneous medium. However, coupling of light to and from the fibre is still possible. This is, for example, possible by using one or more optical lenses that may focus light through the end face and the optical window into the portion of the fibre comprising holes or voids.

As an example, consider the case of coupling out of a single mode fibre. Also, assume that the holes end abruptly and that the window material is optically homogeneous material, i.e. has a uniform refractive index. In this case, the optical single mode will diffract through the windowing region 602 according to the theory on Gaussian beams as written in e.g. "Optical guided waves and devices" by R. Syms and J. Cozens:

$$\omega^2 = \frac{4z^2 + k^2 a^4}{k^2 a^2}$$

where $\omega$ is the beam radius, z is the propagation distance, $k=2n\pi/\lambda_0$ is the wave vector, a is the initial beam radius of the source point z=0 (beam waist), n is the refractive index of the window material and $\lambda_0$ is the wavelength of the light in vacuum.

Figure 7:
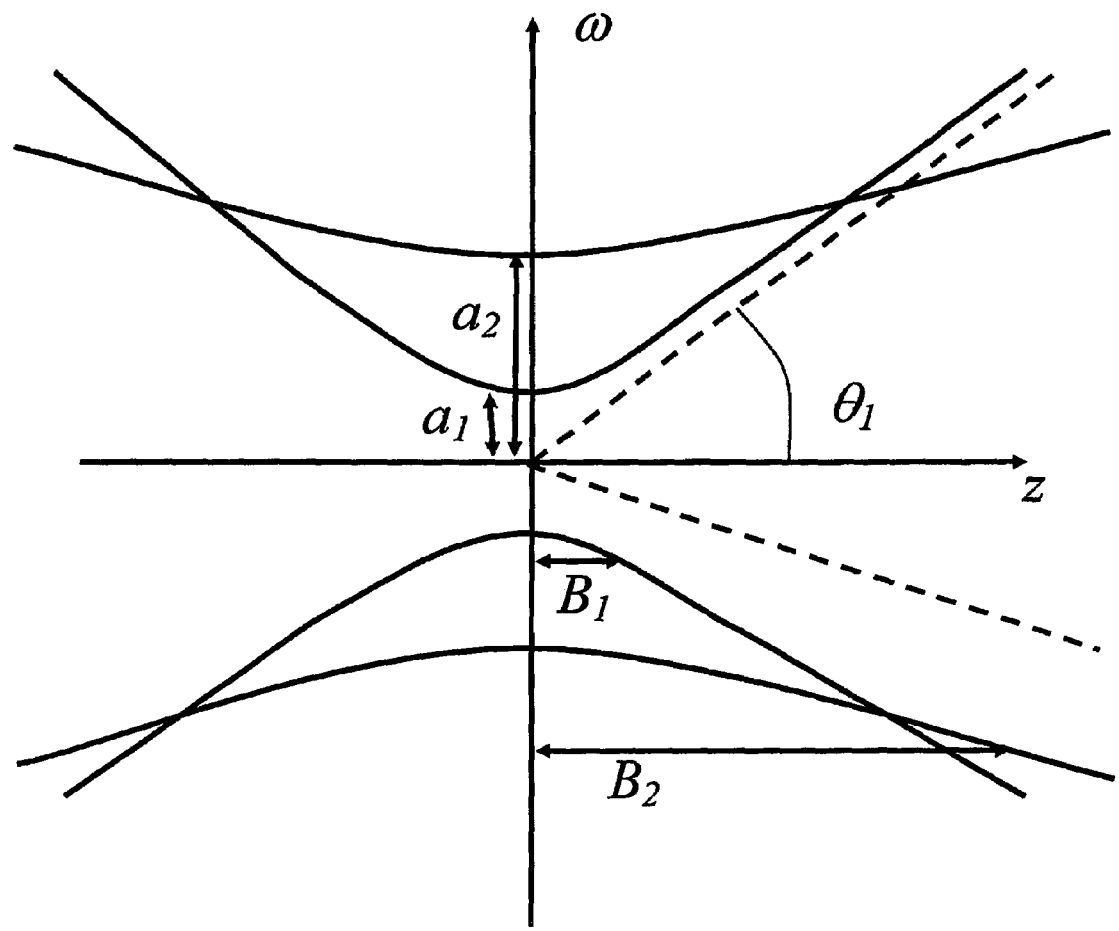
FIG. 7 shows schematically how the beam width increases along the propagation distance in a homogeneous medium. For a small initial beam width, diffraction is larger and the diverging angle thus greater.
Figure 8:
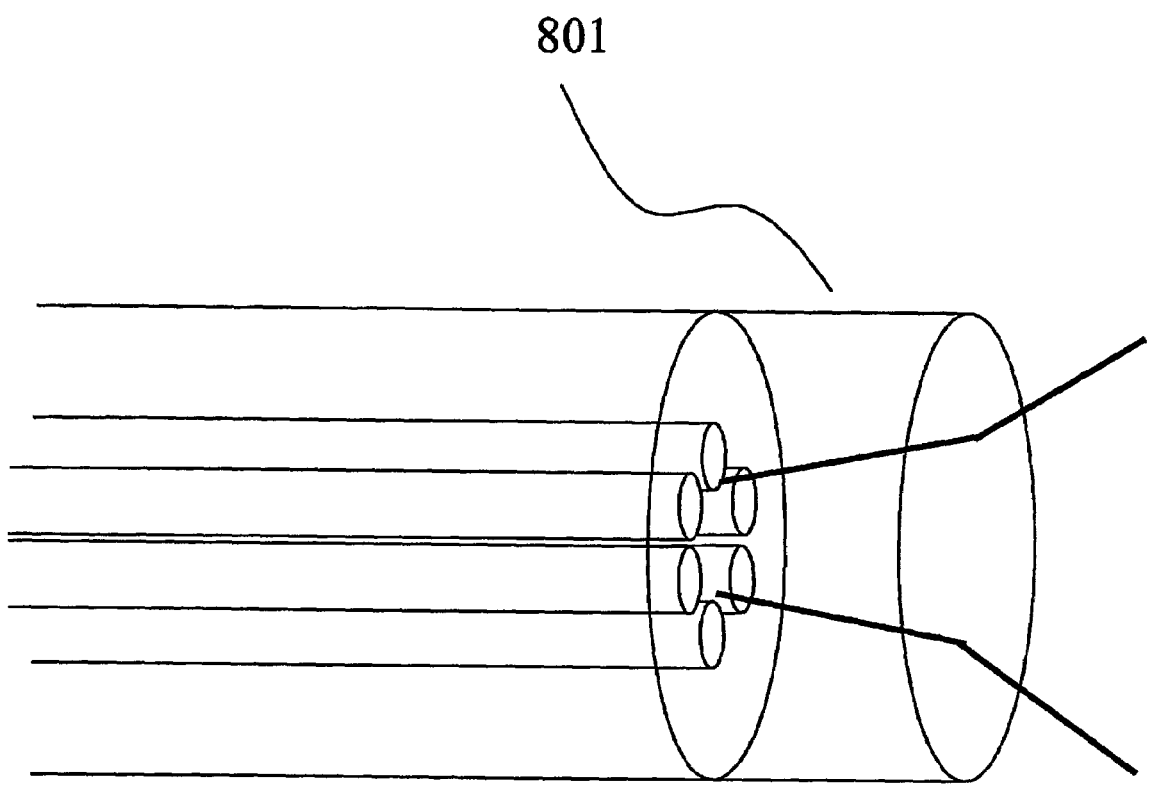
FIG. 8 shows schematically the end face of a microstructured fibre after a homogeneous glass rod has been spliced onto the fibre end. Subsequently the rod has been cleaved a distance away from the fibre-rod interface to define the window thickness. The diffracting light out of the fibre can be seen.

A schematic of the variation of the beam radius as a function of initial beam waist and propagation distance can be seen in FIG. 7. Note that due to the large diffraction angle for a smaller a, the two beam radius curves cross a certain distance z away from the source point. This is important for the design of the window thickness (see later). The focus depths or Rayleigh lengths B is the propagation distance in which the optical beam is expanded by $\sqrt{2}$:

$$B = \frac{n\pi a^2}{\lambda_0}$$

The source point will be the point along the fibre where the guiding is lost, i.e. at the discontinuation of the holes. As can be seen in the above equation, the diffraction angle is given by the wavelength $\lambda$, the refractive index n and the Mode Field Diameter (MFD).

As an example of a design of a connector one could want to make the window so thin that the diffracting beam will not reach the edge of the window to avoid clipping the beam and thus reducing the optical transmission.

As a numerical example, consider the case where $\lambda_0=1.55$ µm, n=1.5, MFD=2·a=3 µm, the window diameter is 125 µm and the refractive index of the window is n=1.5. In this case the full diffraction angle $\theta$ in radians is given by:

$$\theta = \frac{2\lambda_0}{\pi a n} = \frac{2 \cdot 1.55 \mu m}{\pi \cdot 1.5 \mu m \cdot 1.5} = 0.439$$

which corresponds to 25.2 degrees. This means that the thickness of the window can be up to 280 µm, before the edges of the light beam reaches the edges of the window. In contrast to standard optical fibres, microstructured optical fibres may be realized with very small MFD, as for example MFD of around 3 µm or less. Such microstructured optical fibres find, for example, extensive use as nonlinear optical fibres, and the preferred embodiments of the present invention will, therefore, provide improved means for handling nonlinear optical fibres, and thereby facilitating use of such fibres.

For large core, single mode fibres, the window can be thicker. As an example, assume the MFD to be 20 µm (a=10 µm). In this case the full divergence angle is only 3.8 degrees and window can thus be 1900 µm thick. In contrast to single-mode standard optical fibres, single-mode microstructured optical fibres may be realized with very large MFD, as for example MFD of around 12 µm or more at near-infrared wavelengths. Such microstructured optical fibres may, for example, find extensive use as high-power transmission fibres, high-power amplifier or laser fibres, or telecommunication transmission fibres, and the preferred embodiments of the present invention will, therefore, provide improved means for handling large mode area optical fibres, and thereby facilitating use of such fibres.

It should be noticed that the present invention and its preferred embodiments, are in no way limited to single mode optical fibres. The present invention also covers microstructured optical fibres supporting a few or many higher-order modes, as well as the methods described for hermetically sealing of end faces may be applied to such fibres, as well as the present invention comprises preferred embodiments with use of such multi-mode microstructured optical fibres with hermetically sealed end faces.

In the case where the refractive index of the hole filling material is smaller than that of the glass, the guiding effects is decreased since the refractive index of the material will always be larger than that of air. This decrease of the guiding effect might increase the bend losses. However, since this part of the fibre will typically be held inside a straight ferrule, sensitivity to bending will not be a problem.

As another example of a connector design, consider the case where one want to make the window short enough to make sure that the beams does not diffract significantly. This type of connector would be useful for fibre-to-fibre coupling like e.g. PC or APC connectors. In this case the window thickness must be smaller than the Rayleigh length B. A numerical example could be the large core fibre mentioned before where the MFD is 20 μm (a=10 μm). In this case, B can be calculated to be:

$$B = \frac{n\pi a^2}{\lambda_0} = \frac{1.5 \cdot \pi \cdot (10 \mu m)^2}{1.55 \mu m} = 304 \mu m$$

At a position the Rayleigh length away from the optical source point, the beam width is increased by ~1.4. So if two identical fibres were connectorised in this manner with the window having a width of B/2, and brought into physical contact, the coupling losses could be as low as 0.5 dB (see e.g. "introduction to Fiber Optics" by A. Ghatak and K. Thyagarajan), which could be sufficient for a wide range of applications.

In general, the use of a window will in most cases be conceptually different from the traditional cleaved solid fibre end in that the local guiding mechanism of the fibre end is drastically altered and the source point often situated well inside the fibre. In the case of using a lens to couple light into a fibre, this means that the focusing optics has to be adjusted closer to the facet to make sure to focus the light to its smallest dimension at the beginning of the guiding inside the fibre. Contrary to this, for the traditional fibre, the light has to be focused to a spot illuminating the facet.

It may be an advantage to make the window very thin, such that the characteristics of the connector approach that of the traditional fibre connector. Using very thin windows, one can obtain a hermetic sealing of the air holes without significantly disturbing the optical properties of the fibre. Hence, in a preferred embodiment of the present invention, the optical window has a thickness of around 50 μm or less, such as of around 20 μm or less.

An alternative method of creating a window would be to splice a piece of a glass rod onto the fibre (see FIG. 3). This piece of rod could be made of homogeneous material and would normally be chosen such that the diameter is comparable with the fibre diameter. The refractive index of the window material should be close to the effective refractive index of the guided mode of the fibre to reduce reflections. After splicing, the rod could be cleaved to define the window width, 801. This method can be advantageous where high power is to be coupled in and out of the fibre, since this would avoid the risk of optical degradation or burning of hole filling material, which might otherwise occur.

Figure 9:
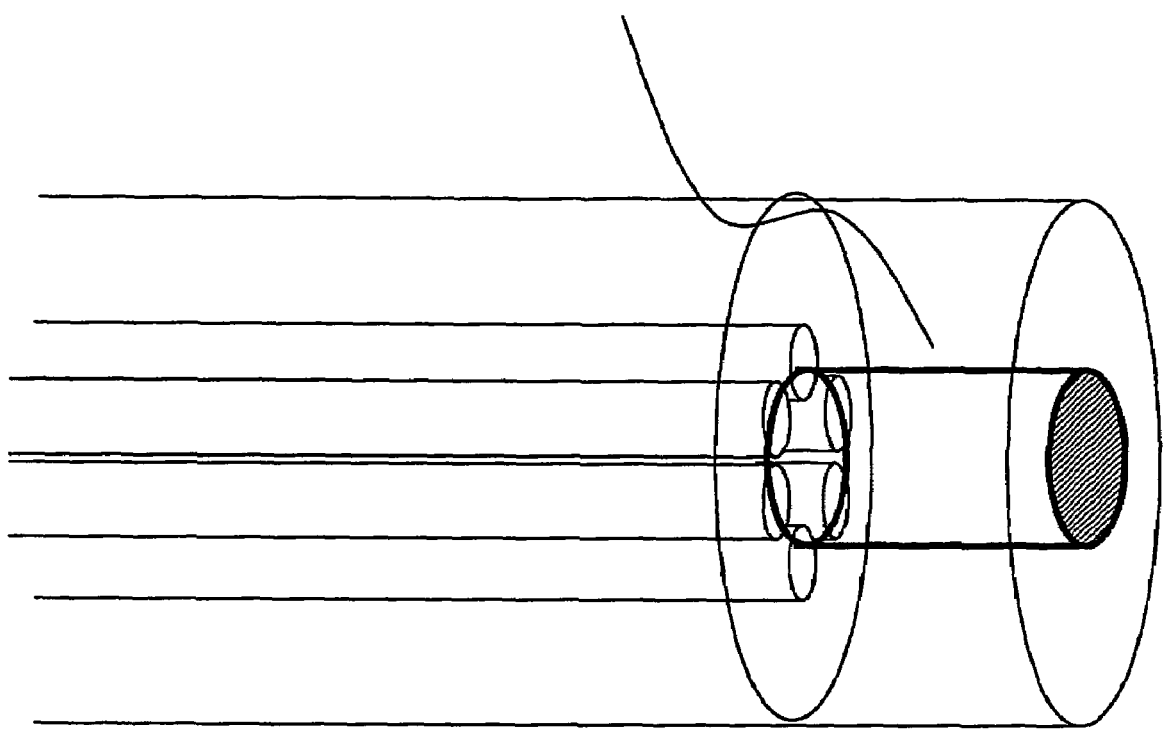
FIG. 9 shows schematically the end face of a microstructured fibre after a solid optical fibre, that matches the MFD, has been spliced onto the microstructured fibre end. Subsequent cleaving defines the length of the solid portion of fibre.

However, the piece of glass rod does not have to be made of homogeneous material. Splicing onto the fibre end a length 901 of traditional optical fibre, whose MFD is comparable to the MFD of the microstructured fibre, the optical beam width is preserved all the way through the window (see FIG. 9). In this case, the fibre can be connectorised the same way as traditional, solid, all-glass fibres. There would no longer be limitations to the window width, 901, although placing the fibre interface inside the connector ferrule might increase the total strength and long-term reliability of the fibre system.

Figure 10:
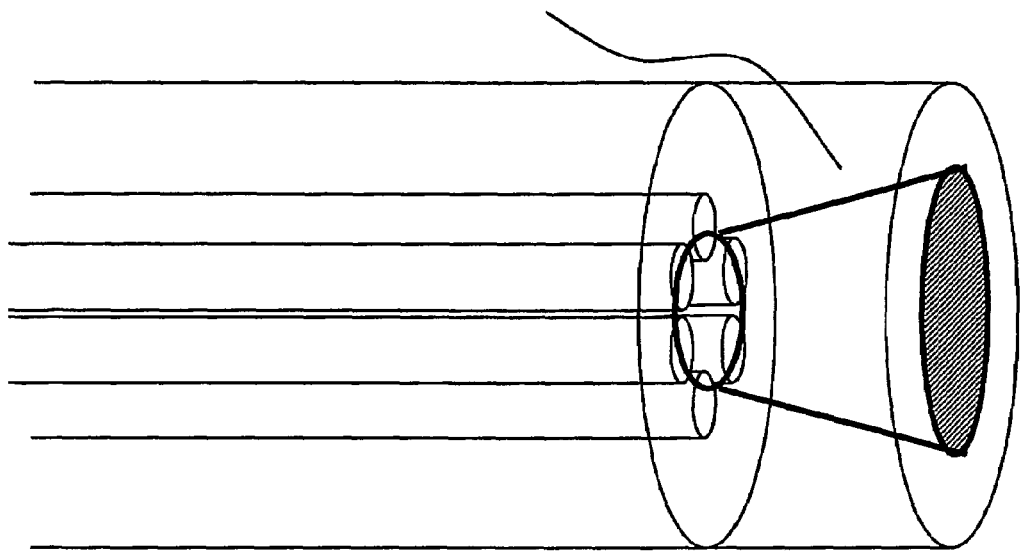
FIG. 10 shows schematically two examples where a solid optical fibre has been spliced onto the end face of a microstructured fibre. These two fibres alter the MFD along the length of the fibre section. Subsequent cleaving defines the lengths of the solid portions of fibres.
Figure 10:
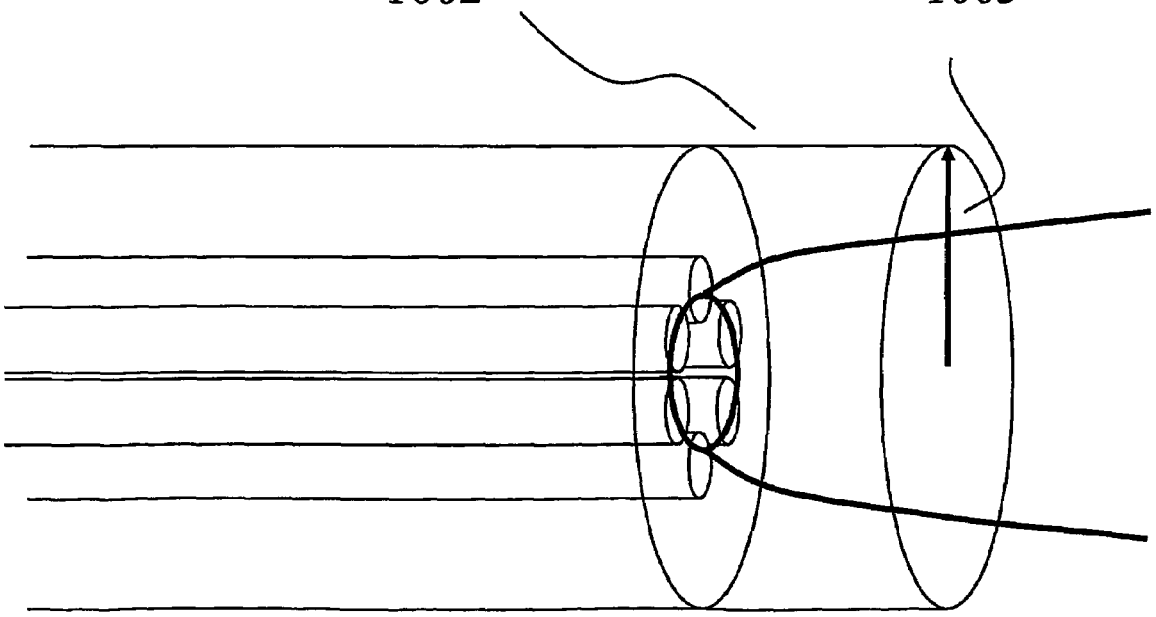

Further, the window can be made using a piece of optical index guiding fibre 1001, whose MFD increase or decreases along its length (see FIG. 10). Such approach can be used to decrease the splice losses in the fibre interface and/or tailor the MFD at the end of the window. Again, for this fibre system, placing the splicing region within the connector ferrule can be advantageous for the reasons mentioned above. The decreasing or expanding core of the solid fibre section can be obtained by locally heating the fibre prior to assembly. This heating will induce an outwards diffusion of the core defining dopants, thus creating a so-called thermal expanding core. The optical index guiding fibre can also be a graded index (GRIN) fibre 1002, in which the refractive index decreases along the arrow 1003 in the radial direction. Such a piece of fibre can be used as an alternative approach to manipulate the light at a connector interface.

It may be a disadvantage that contaminations of the end facets may occur prior to splicing and thereby increase loss, degrade power handling, degrade optical properties, and/or degrade mechanical properties of the final fibre. It is, therefore, desired to provide microstructured optical fibres with hermetically sealed end-faces and methods of producing such fibres, and their use, where the risk of contaminations is eliminated. In preferred embodiments of the present invention, various methods of sealing the end face directly in a single fibre are provided—as shall be described next.

Figure 11:
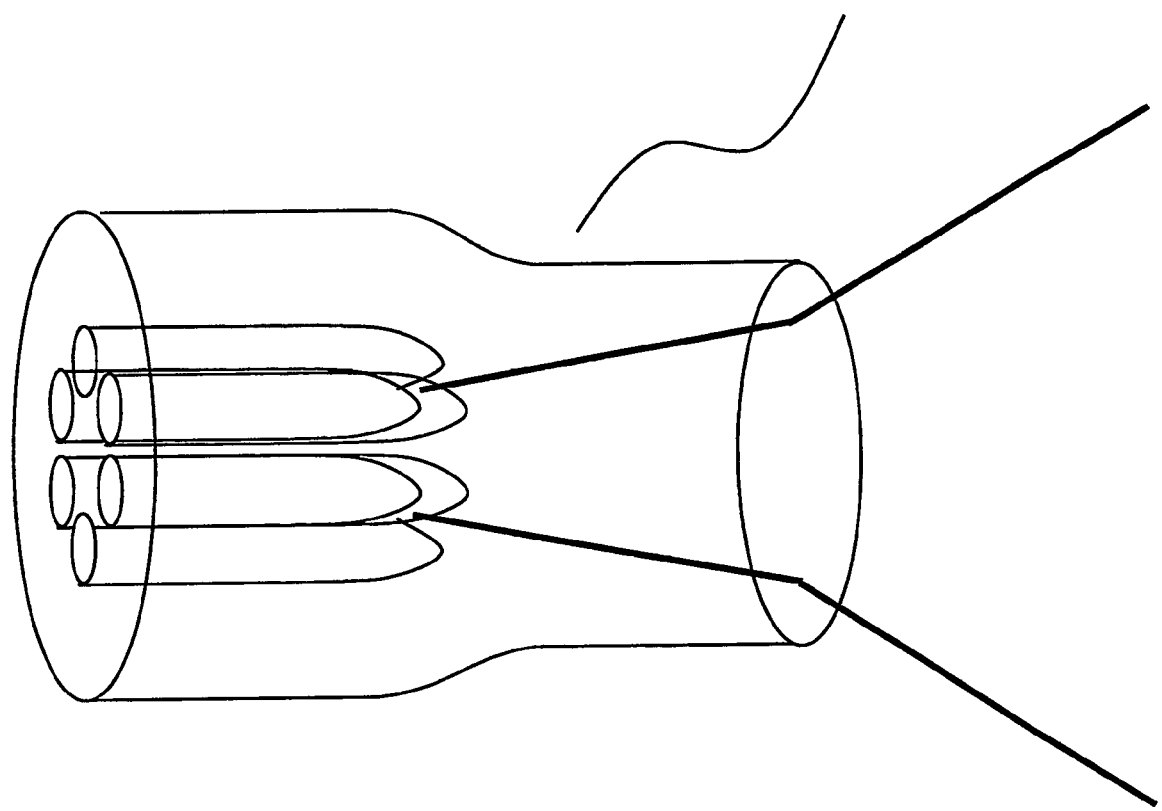
FIG. 11 shows schematically the end face of a microstructured fibre after heat treatment of the fibre followed by cleaving. Due to the heat treatment, the holes collapse and cleaving defines the length of the solid portion. The flat end face of the fibre can be seen as well as the expanding light out of the fibre.
Figure 12:
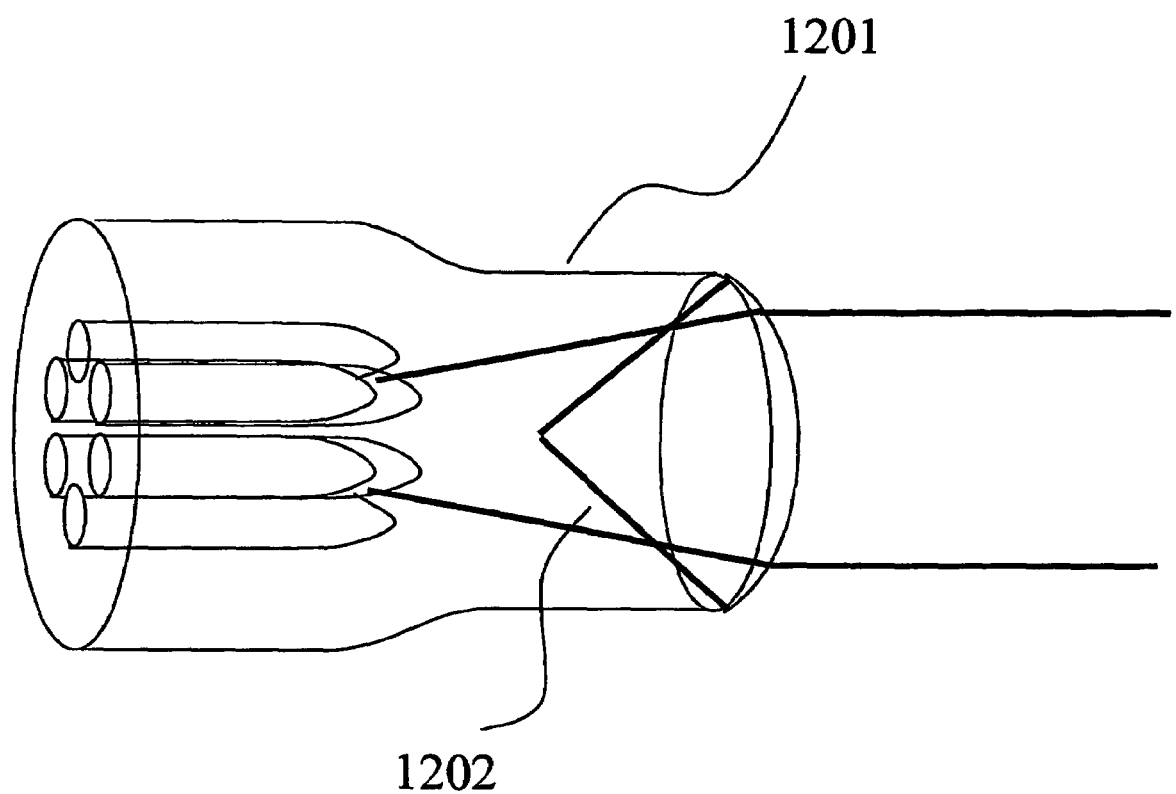
FIG. 12 shows schematically the end face of a microstructured fibre in the case where the heat treatment is performed after the cleaving. The heating causes collapse of the holes a distance away from the fibre end. Due to surface tension the end facet forms a curve with a radius of curvature, which acts as a lens. In this example, the collimated light out of the fibre can be seen.

The present inventors have realized an advantageous way of creating a window by use of heat to collapse the holes before or after cleaving the fibre (see FIGS. 11 and 12). The hermetical sealing is obtained by completely collapsing the holes to form a solid fibre portion. Since the hermetic sealing is made without introducing new material, this will make sure that there is no abrupt interface between glass materials. Also, by making a gradual heat profile along the fibre length, the collapse of the holes can be made gradually, so that the loss/decrease of guiding will happen gradually. This may ease the transformation from a bound mode to a freely propagating mode, so that transmission losses may be reduced.

Depending on the application one can choose to apply heat to the end of the microstructured fibre before and/or after the cleaving (see FIGS. 11 and 12). Collapsing the holes before the cleaving will put high demands on precision of the cleaving position to define the window width 1101. In preferred embodiments, the cleaving is, therefore, performed after heating to render a more accurate window width 1101. Such as a solid fibre portion smaller than or equal to 2 mm in length, such as smaller than 1 mm, such as smaller than 0.5 mm, such as smaller than 0.5 mm, such as smaller than 0.01 mm, such as smaller than 0.02 mm. The advantage is that the fibre facet is flat which might make e.g. lens coupling easier.

Alternatively, the facet can be heated after the cleaving. During the heating, two things will happen simultaneously: the holes will collapse a distance 1201 into the fibre and surface tension will make the facet start to curve and thus deviate from a flat surface. This curvature could be desirable to facilitate coupling into the fibre. In fact, being able to control the distance of collapse into the fibre 1201 and the radius of curvature of the facet 1202, a build-in collimator or even refocusing can be achieved. Typically, an iterative process will be required to provide a desired curvature, where parameters such as heat and time of exposure to heat and area/fibre length exposed to heat are varied.

The present inventors makes use of a commercially available equipment for cleaving, splicing and heating optical fibres, where the optical fibre, its end, as well as its end face may be monitored visually using built in cameras. Such equipment is available on commercial basis through the company Vytran, as e.g. type FFS-2000. This equipment allows, for example, for iterative processes and adjustment of required parameters for heating, cleaving, and splicing of fibres and methods according to the various preferred embodiments of the present inventions. In particular, this equipment allows for accurate determination of dimensions of optical windows, such as a predetermined length of the solid light transparent fibre portion, e.g. a window width 1101, as well as for visual inspection of the microstructured optical fibres and their ends, as well as their end faces.

The heat source would typically be situated in a fusion splicer, as the above-described Vytran equipment, and would thus be an arc, a flame or a filament. Typically, such heating can thus be made with a high degree of control and reproducibility. The cleaving would typically be performed by scribing the fibre a predetermined position with diamond scriber while applying tension to the fibre.

Figure 13:
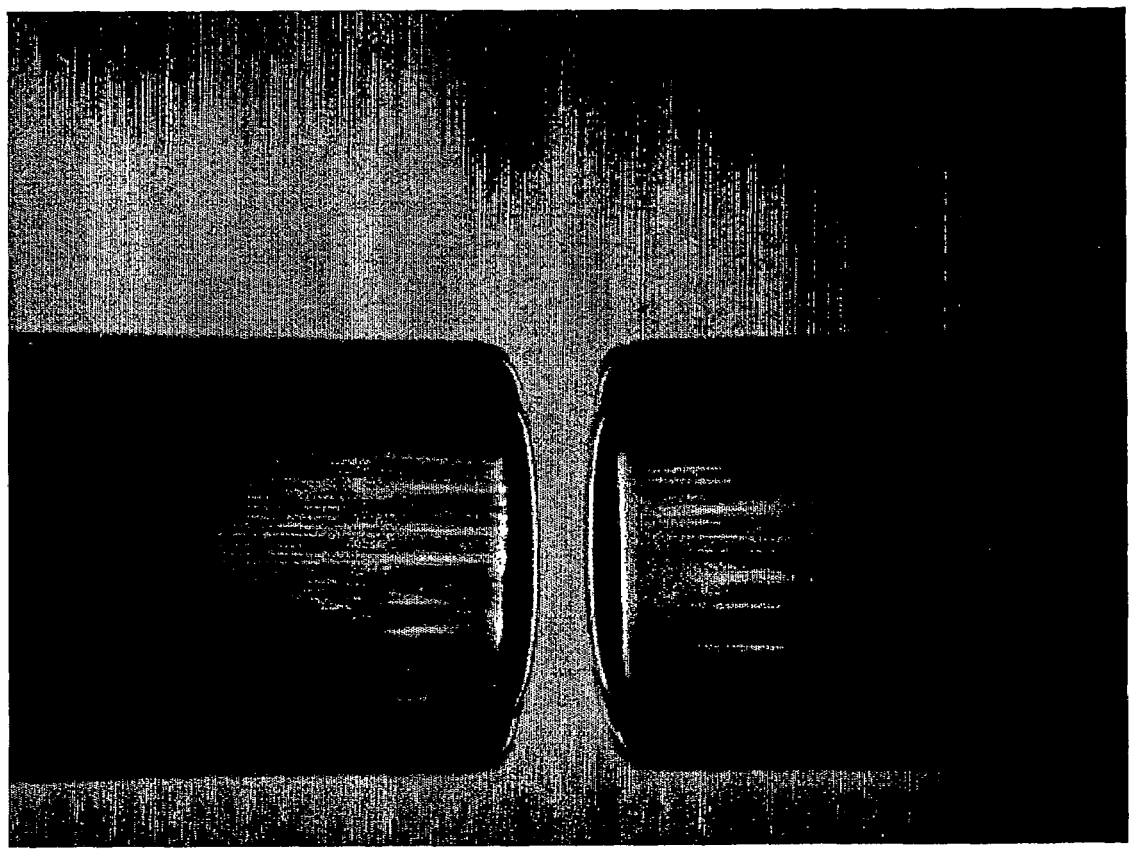
FIG. 13 shows a photograph of two fibres end after cleaving and heating. Partial collapse of the holes is seen.
Figure 14:
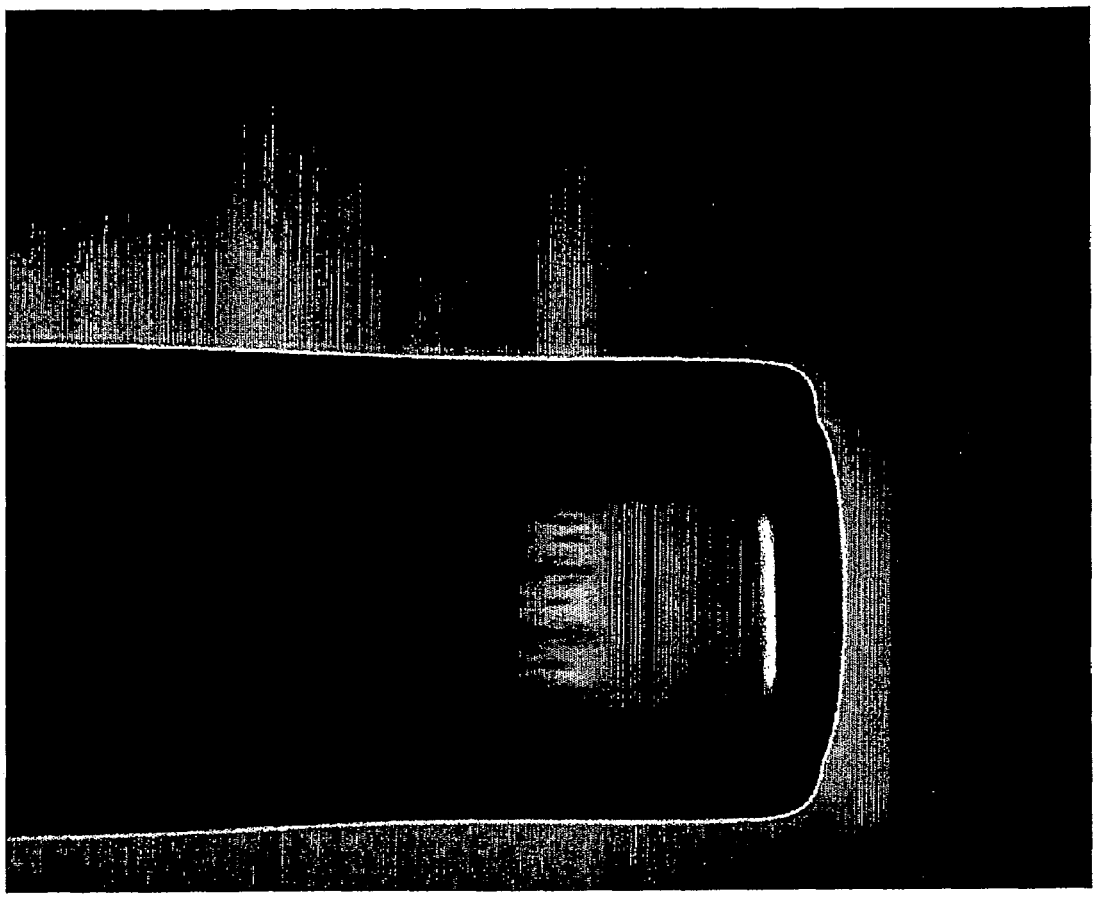
FIG. 14 shows a photograph of a cleaved fibre end after cleaving and heating
Figure 15:
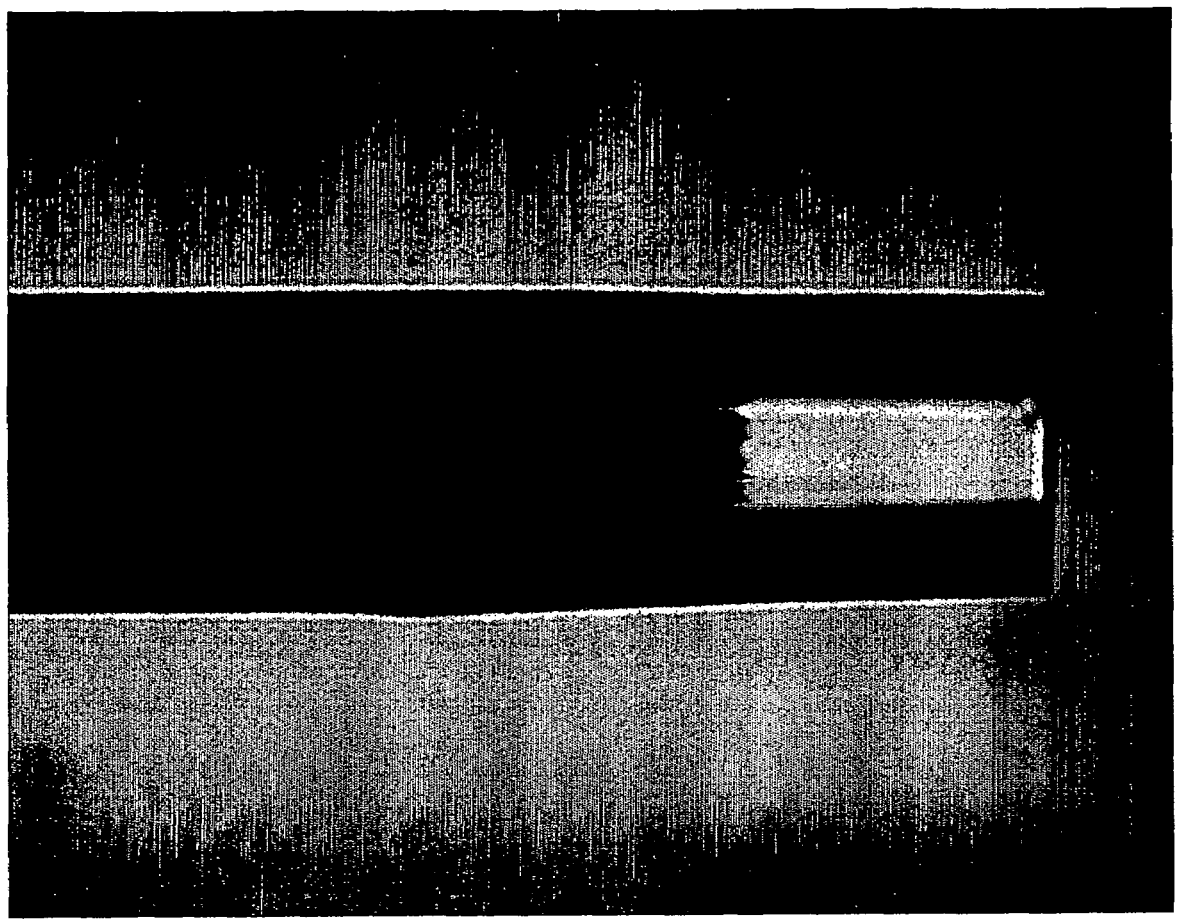
FIG. 15 shows a photograph of a heated fibre end after cleaving

FIGS. 13 and 14 shows photographs of such a fibre taken using the above-mentioned Vytran equipment. In this case, two cleaved fibre ends are positioned with a 10 μm distance. Then, using a resistive tungsten filament, the area around the interface is heated intensely and rapidly. In the example shown in FIG. 14, we have used 30 W heating power for 0.55 sec. Higher powers and longer heating will cause the fibre end to "curl up" more and create a lens with smaller curvature and shorter focal length. Also, more heating may cause the holes to collapse a longer distance away from the cleaved fibre end. In FIG. 13, we have used 30 W and only 0.5 sec and it can be seen that this smaller heating is not quite sufficient to hermetically seal off the fibre end.

Alternatively, the heating and/or cleaving could originate from a laser source, such as a CO2 laser. The optical intensity can be adjusted by either changing the total optical laser output power or by adjusting the optical beam diameter. The optical beam from the laser could be either Continuous Wave (CW) or pulsed. The temporal pulse width and repetition rate is important for the way the optical fibre material reacts to the heating. Tight focusing of a laser beam with very high peak intensities combined with short pulses will make the exposed fibre material evaporate or ablate. Typically, the temperature gradient is very large and the volume of melted material is small. If alternatively the laser emits a CW beam or the volume of exposed material is larger, the volume of melted fibre material is typically larger and the temperature gradient smaller. Thus, the laser could be used to create hermetically sealed microstructured fibre end with either a flat or a curved facet, as well as providing a high degree of control over window thickness.

It must be emphasised that defining an optical window at the end of the fibre can have great advantages for high optical powers. Generally, catastrophic optical damage due to high optical powers is caused at the facet where the damage threshold is lower. By letting the guided light diverge before reaching the facet, the local facet intensity can be lowered, and the optical power thus increased before risking optically induced damage.

Figure 16:
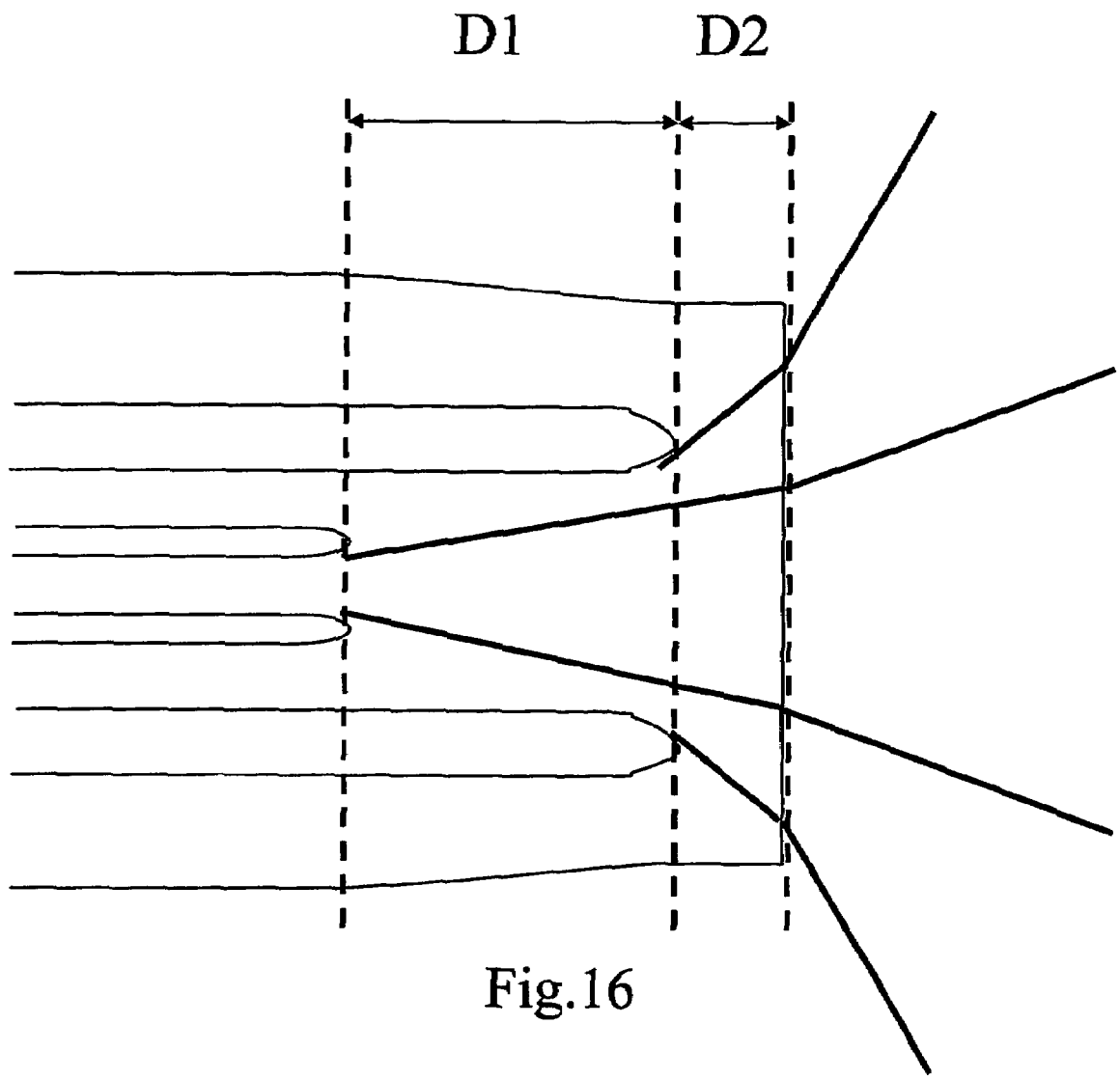
FIG. 16 shows schematically the collapse at different positions, depending on holes sizes.

Further, by fabricating the optical fibre with a larger outer diameter, more divergence is possible. For a certain outer diameter, the window thickness can be chosen so that the beam width will be comparable with the outer diameter of the fibre. In the case of extremely high powers, the outer fibre diameter can be increased from 80 μm or 125 μm to 300 μm, 500 μm, 1 mm or even 2 mm. Some microstructured optical fibres are designed to include holes with several diameters. An example of the is the rare-earth doped fibre laser as described in "Cladding pumped Ytterbium-doped fiber laser with microstructured inner and outer cladding", K. Furusawa, et. al, Optics Express, vol. 9, no. 13, 2001. In the case of hole collapse due to heat treatment, such holes can be made to collapse different distances from the end of the fibre. An example of this can be seen in FIG. 16. Since the heat induced hole collapse is driven by surface tension, smaller holes will tend to collapse at a lower temperature, whereas higher temperatures are need to collapse larger holes. In the paper mentioned above, smaller holes are used to define a (low Numerical Aperture) single mode core, whereas a ring of larger holes define a (high Numerical Aperture) multimode region. By heat-treating the fibre according to a preferred embodiment of the present invention, the smaller holes collapse further behind the fibre end than do the larger holes. By using an appropriate heat-treatment profile, the fibre end can for example be made so that the light exiting from the single mode and/or the multi mode core will be significantly expanded.

As a numerical example consider a fibre with an outer diameter of 200 μm, where the outer ring of holes define a multi mode core with a diameter of 100 μm and a Numerical Aperture of 0.5. The inner, smaller holes define a single mode core with a 15 μm diameter and a Numerical Aperture of 0.05. To make sure that the light can exit and enter the multi mode core, D2 in FIG. 16 need to be smaller than 87 μm. For a D2 of 87, the light will fill the 200 μm facet. D1 can be more than 800 μm, before the larger holes start clipping the light exiting and entering the single mode core.

Figure 17:
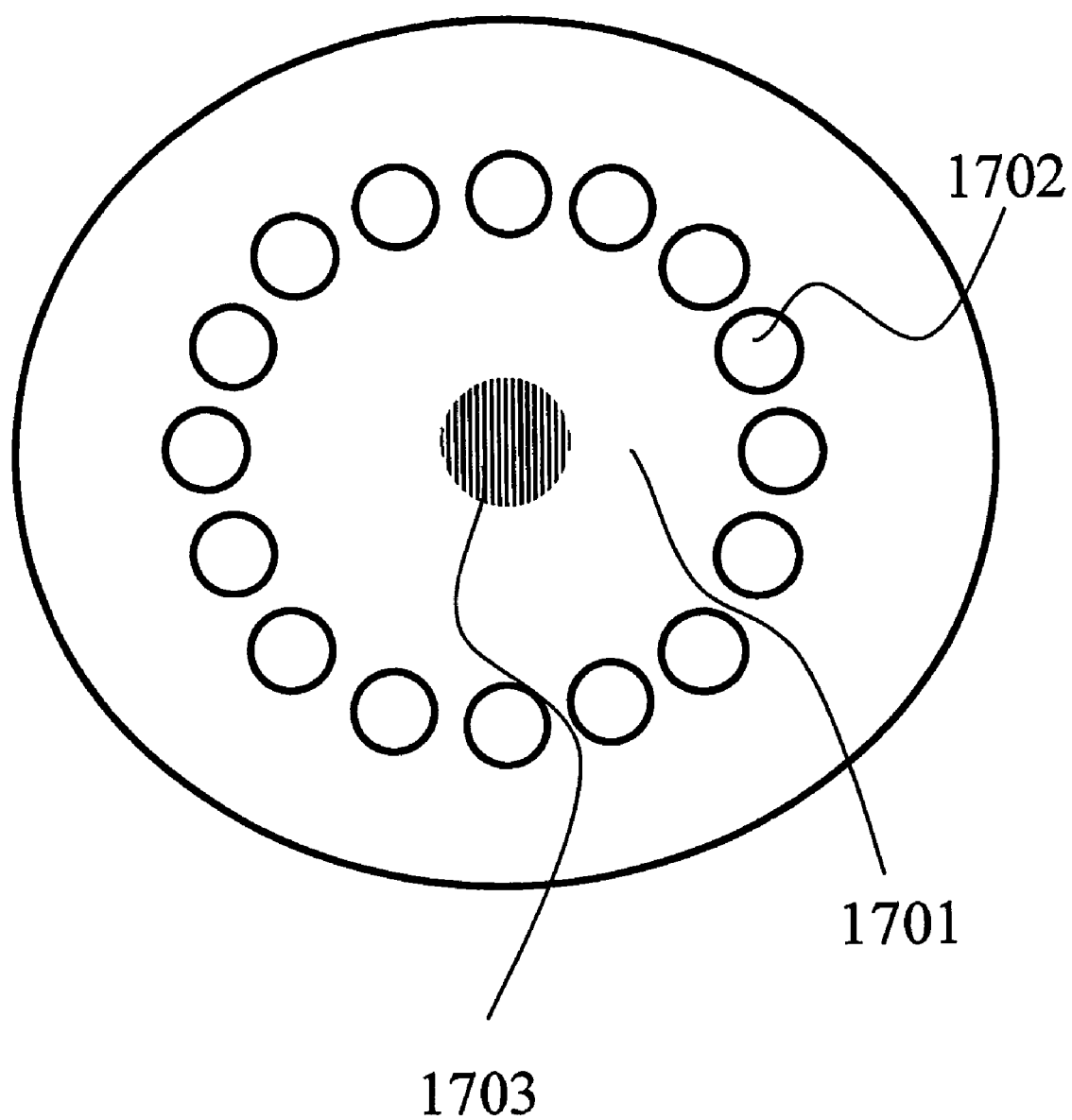
FIG. 17 shows schematically a cross-section of a double cladding optical fibre comprising a microstructured outer cladding region and a solid inner cladding region.
Figure 18:
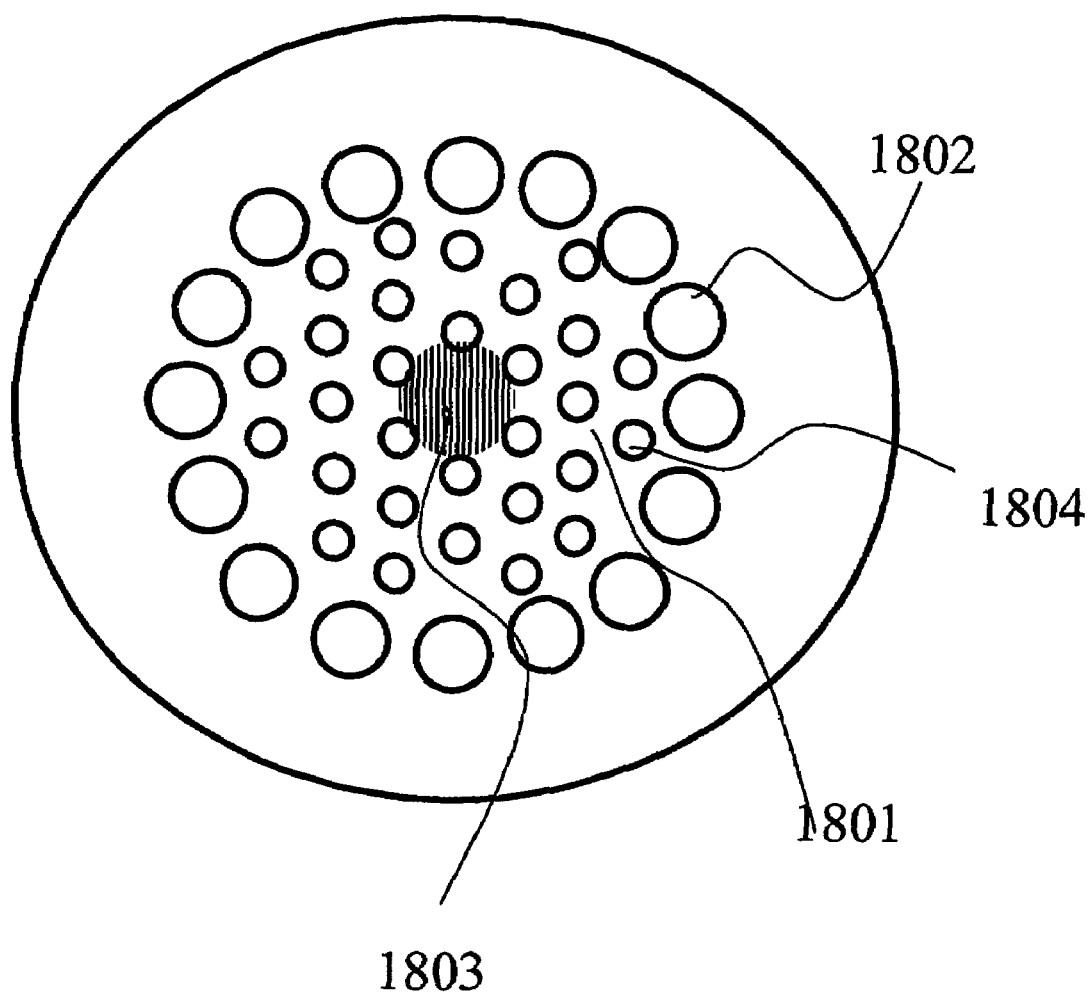
FIG. 18 shows schematically a cross-section of a double cladding optical fibre comprising a microstructured outer cladding region and a microstructured inner cladding region.

The above-discussed microstructured fibres have a double cladding supporting both a large diameter Multi Mode (MM) inner cladding and Single Mode (SM) core within the inner cladding. Such fibres may be arranged and used both as fibre lasers and fibre amplifiers. In both cases, the MM inner cladding 1701, 1801 is surrounded by one or more ring of large air holes 1702, 1802. The SM core 1703, 1803 may be defined by having a core material having a larger refractive index than the inner cladding (see FIG. 17), and/or by micro structuring the inner cladding (see FIG. 18). In the latter case, the holes 1804 within the inner cladding will typically be smaller than the ones surrounding the inner cladding.

The holes surrounding the inner cladding make sure that the inner cladding is a waveguide, typically with large Numerical Aperture (NA). The high NA makes it possible to increase the optical power density within the inner cladding. Both in the case where the fibre is used as a laser and where used as an amplifier, the pumping energy comes by coupling light from one or more high power multimode lasers into the inner cladding. A fundamental physical law says that one cannot increase brightness of an optical beam. Brightness is defined as the optical power per area per solid angle. The high NA of the inner cladding makes it possible to couple light into it at large solid angles. Thus, the power per area can be increased and the inner cladding diameter can be decreased compared to other MM fibres.

For a double cladding fibre, the SM core typically consists of silica with actively doped material such as rare earth ions (Yb, Pr, Er, Nd etc.). These atoms absorb the pumping light and re-emits photons at a lower energy. The absorption coefficient depends on the concentration of the atoms (the doping level) but also on ratio of SM core area to the inner cladding area. Thus, since the high NA enables smaller inner cladding, the absorption coefficient can be drastically increased, and the laser/amplifier efficiency can be increased.

Figure 19:
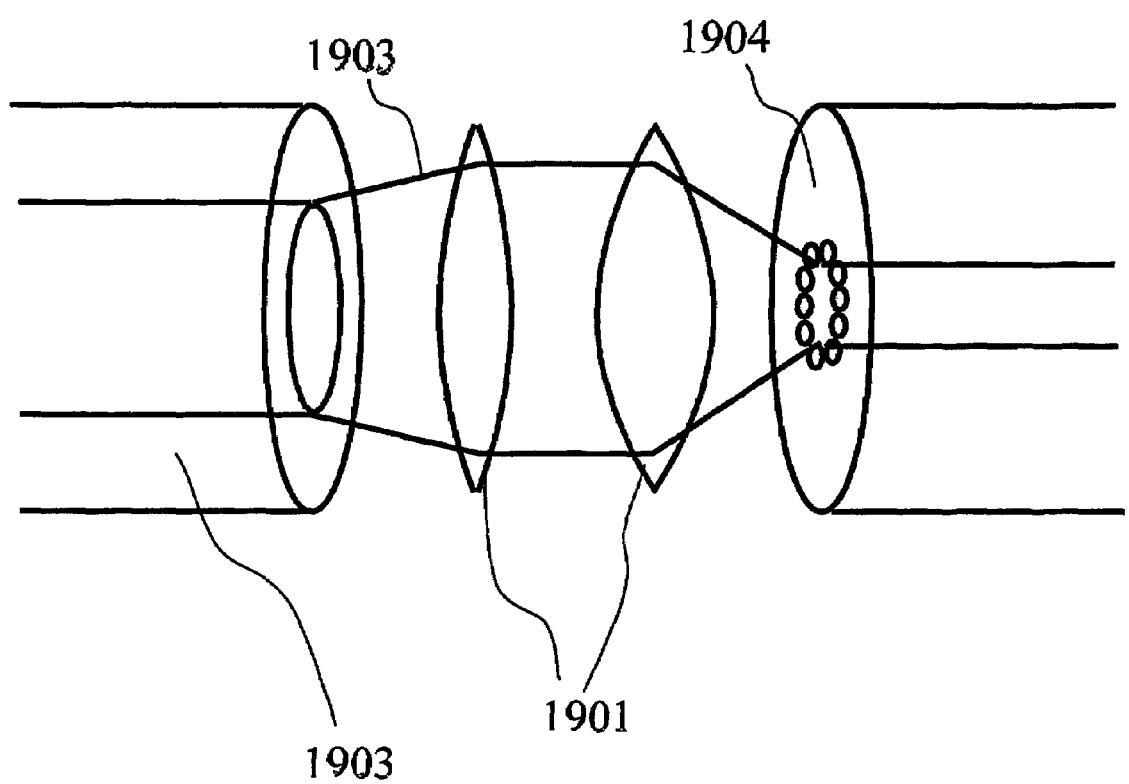
FIG. 19 shows schematically a lens system to couple light from one optical fibre to another.

As an example of such a devices, consider a high power semiconductor laser pigtailed to a standard technology (solid glass) MM fibre. Such fibre could have a core diameter of 100 μm and an NA of 0.2. Using a lens system 1901 to re-image the light 1902 from this MM fibre 1903 onto the facet of the double cladding fibre 1904 (see FIG. 19), incoupling with high NA can be done. The diameter multiplied by the NA is conserved, thus the diameter of the re-imaged spot will be 40 µm. Designing the inner cladding to this diameter will enable high coupling efficiency of this pump light.

The disadvantage of using cleaved fibre ends for such a component, is that the optical power density at the fibre facet can become very high, and catastrophic optical damage of the facets due to this high energy can occur. Also, using a cleaved facet means that the holes are exposed, which means that contamination accumulated on the facet is difficult to remove. Additionally, the exposed holes mean that contaminants, such as dust, liquids or vapours can enter the holes and contaminate the inside of the fibre further from the facet.

Sealing the holes at the ends of the Photonic Crystal Fibre (see FIGS. 11 and 16) will solve all the problems mentioned above: the holes are hermetically sealed, preventing contamination and enabling easy cleaning of the facet, the thickness of the optical window can be made such that the optical power density can be decreased, thus reducing the risk of catastrophic optical damage.

For sealed fibre ends, the incoupling lens must be positioned closer to the fibre such that the focus point is positioned where the holes (and thus the guiding) begin. Our experiments have shown that the coupling efficiency remains the same for sealed and cleaved fibres.

Sealing the fibre ends will thus enable realization and use of an improved fibre laser or amplifier components.

Figure 20:
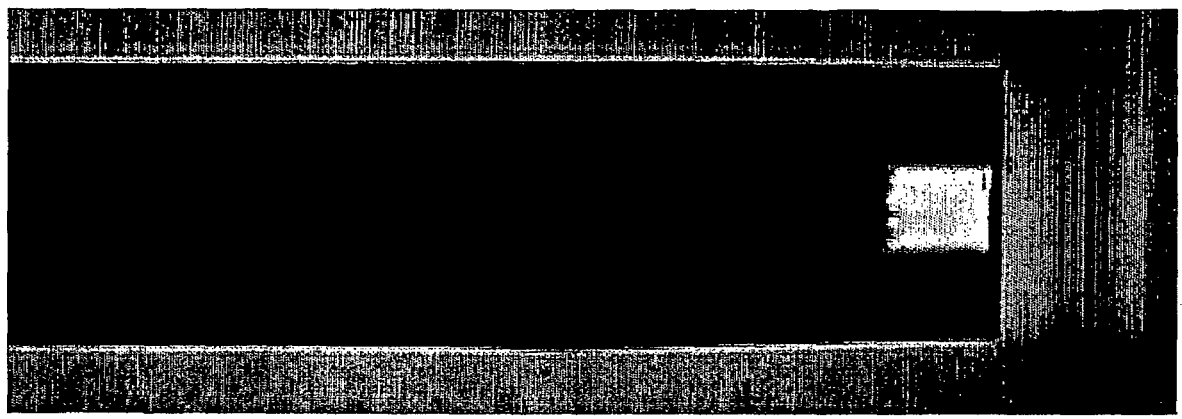
FIG. 20 shows a photograph of a side including the end of an optical fibre according to a preferred embodiment.
Figure 21:
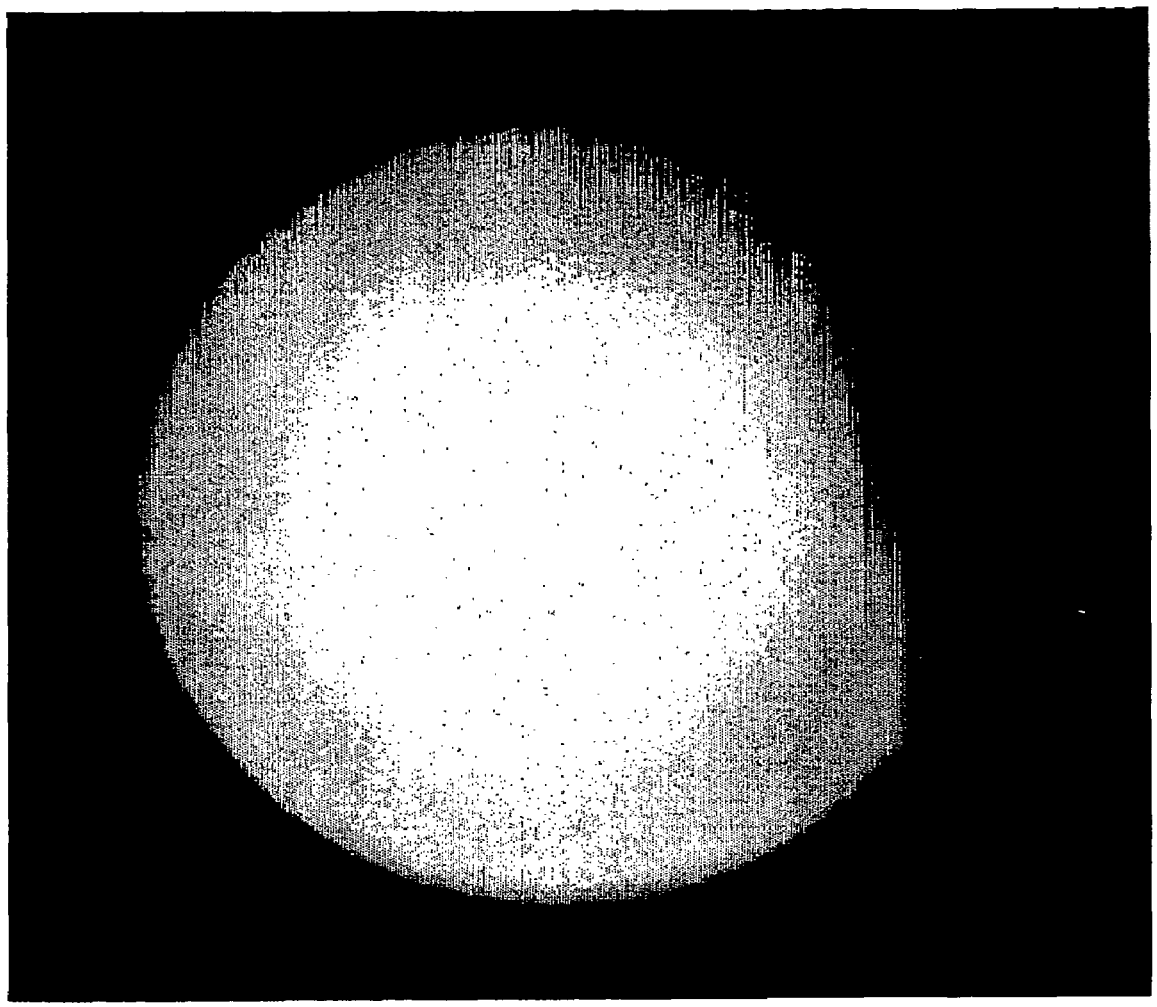
FIG. 21 shows a photograph of a hermetically sealed end-facet of an optical fibre according to a preferred embodiment.
Figure 22:
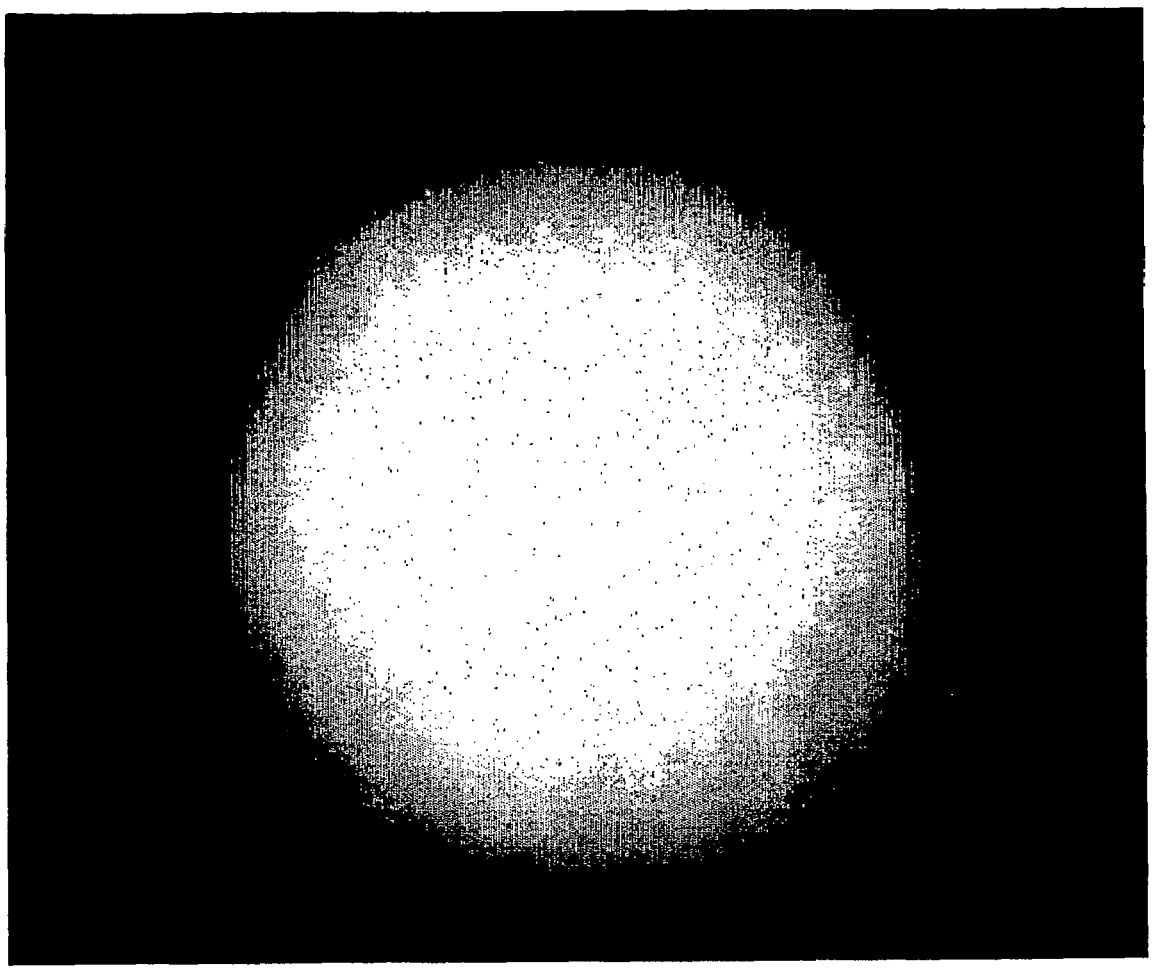
FIG. 22 shows a photograph from within' an optical fibre according to a preferred embodiment.

FIG. 20 shows another example of an optical fibre according to a preferred embodiment of the present invention. The figure shows a photograph from the side of the fibre illustrating both the microstructured fibre portion and the solid fibre portion. The fibre has been realized by a method where holes or voids of the microstructured fibre are collapsed using the aforementioned Vytran equipment to form a solid fibre portion. Afterwards, the solid portion has been cleaved and visually inspected using the Vytran equipment to yield a solid portion of length approximately equal to 45 µm. It is apparent from FIG. 20 that the solid fibre portion may have an approximately similar outer dimension as the microstructured fibre portion. FIG. 21 and FIG. 22 shows two optical pictures that have been taken using an optical microscope. Both figures are for the same fibre, namely the fibre seen from the side in FIG. 20. FIG. 21 is taken for the optical microscope being focused on the end face of the fibre, as seen from the figure, no holes are open, but a solid closed end face appears—thereby providing a hermetical sealing of the microstructured optical fibre. FIG. 22 is taken in the case, where the optical microscope has been focussed within the microstructured fibre. Since the solid portion of the fibre is transparent, it is possible to obtain a picture 'from within' the fibre. The picture in FIG. 22 has been focussed to approximately 45 µm within the fibre, where the holes or voids are seen to appear (this is in agreement with the picture in FIG. 20). Hence, the FIGS. 20, 21, and 21 in combination, shows that it is possible to obtain a hermetically sealed end face of an optical fibre comprising holes or voids in a cladding region as well as comprising a solid transparent fibre portion that provides both hermetical sealing of the end face and optical access to the microstructured portion of the optical fibre. The relatively short thickness as well as the negligible reduction in outer diameter for the solid fibre portion as compared to the fibre portion comprising holes or voids in the cladding, renders the here-disclosed optical fibre and articles using such an optical fibre significantly more mechanically robust and stabile than, for example, tapered microstructured optical fibres, as known from the prior art; e.g. WO 00/49 435 discloses a photonic crystal fibre including a plurality of longitudinal holes, in which at least some of the holes have a different cross-sectional area in a first region of the fibre, which region has been heat treated after its fabrication, from their cross-sectional area in a second region of the fibre, whereby the optical properties of the fibre in the heat-treated region are altered by virtue of a change in cross-sectional area of holes in that region. Nothing is indicated nor suggested about hermetically sealing of cladding voids or core voids. In particular, nothing is indicated nor suggested about providing mechanically stable hermetically sealed ends of microstructured optical fibres. In contrast, WO 00/49 435 discloses a tapered photonic crystal fibre that may be more fragile and susceptible to mechanical influence.

While the invention has been particularly shown and described with reference to particular embodiments, it will be understood by those skilled in the art that various changes in form and details may be made therein without departing from the spirit and scope of the invention, and it is intended that such changes come within the scope of the following claims.

The invention claimed is:

1. A method of producing a sealed microstructured optical fibre, the fibre comprising a first light guiding optical fibre portion comprising a cladding region with a plurality of spaced apart cladding voids extending longitudinally in the fibre axial direction and a core region bounded by said cladding region, the first light guiding fibre portion comprising an end with an end surface and a first outer cross-sectional dimension, the method comprising:

forming or arranging a solid light transparent fibre portion at said end of the first light guiding fibre portion so as to provide a hermetic sealing of said cladding voids, said solid fibre portion comprising a second outer cross-sectional dimension and further comprising a first end facing the first light guiding fibre portion by being attached thereto or by sharing a common solid background material, and a second end opposite said first light guiding fibre portion;

arranging said solid fibre portion so that when light is transmitted from the first light guiding fibre portion to the solid fibre portion, the light enters the solid fibre portion via the first end and leaves the solid fibre portion via the second end;

said second outer cross-sectional dimension of said solid fibre portion being substantially equal to the first outer cross-sectional dimension of said first light guiding fibre portion;

said first light guiding fibre portion comprising a Mode Field Diameter, MFD, defining a first optical field diameter of light at the first end of the solid fibre portion when light is transmitted from the first light guiding fibre portion to the solid fibre portion, and the transmitted light comprising a second optical field diameter when reaching the second end of the solid fibre portion; and said solid fibre portion being dimensioned so that the second optical field diameter is larger than the first optical field diameter.

2. The method according to claim 1, wherein the solid fibre portion is formed by fastening or splicing a piece of glass or silica rod to an end part or end surface of the first light guiding fibre portion.

3. The method according to claim 2, wherein the glass or silica rod is made of a homogeneous material.

4. The method according to claim 2, wherein the material forming the glass or silica rod has a refractive index larger than an effective refractive index of the cladding region for a guided wavelength of light in a range of 400-1700 nm.

5. The method according to claim 2, said method further comprising the step of cleaving the solid fibre portion to thereby obtain a cleaved end of the solid fibre portion.

6. The method according to claim 5, wherein the solid fibre portion is cleaved so as to obtain a predetermined length.

7. The method according to claim 1, wherein the arranged solid fibre portion includes a piece of optical fibre with a light guiding core.

8. The method according to claim 7, wherein the optical fibre of the solid fibre portion has a Mode Field Diameter (MFD) substantially equal to the MFD of the first fibre portion.

9. The method according to claim 7, wherein the optical fibre of the solid fibre portion has an expanding Mode Field Diameter (MFD), which is larger at the second end than at the first end of the solid fibre portion.

10. The method according to claim 9, wherein the MFD of the optical fibre of the solid fibre portion is substantially equal to the MFD of the first fibre portion at the first end of the solid fibre portion.

11. The method according to claim 7, wherein the optical fibre of the solid fibre portion has a tapered Mode Field Diameter (MFD), which is smaller at the second end than at the first end of the solid fibre portion.

12. The method according to claim 7, said method comprising the step of splicing the optical fibre of the solid fibre portion to the first fibre portion.

13. The method according to claim 12, wherein said splicing process comprises a fusion splicing.

14. The method according to claim 1, wherein the arranged solid fibre portion includes a piece of optical fibre with a graded refractive index profile.

15. The method according to claim 14, wherein said piece of optical fibre is adapted to collect, collimate or focus light to and from a first optical fibre region.

16. A method of producing a sealed microstructured optical fibre, the fibre comprising a first light guiding optical fibre portion comprising a cladding region with a plurality of spaced apart cladding voids extending longitudinally in the fibre axial direction and a core region bounded by said cladding region, the first light guiding fibre portion comprising an end with an end surface and a first outer cross-sectional dimension, the method comprising:
  forming or arranging a solid light transparent fibre portion at said end of the first light guiding fibre portion so as to provide a hermetic sealing of said cladding voids, said solid fibre portion comprising a second outer cross-sectional dimension and further comprising a first end facing the first light guiding fibre portion by being attached thereto or by sharing a common solid background material, and a second end opposite said first light guiding fibre portion;
  arranging said solid fibre portion so that when light is transmitted from the first light guiding fibre portion to the solid fibre portion, the light enters the solid fibre portion via the first end and leaves the solid fibre portion via the second end;
  said second outer cross-sectional dimension of said solid fibre portion being substantially equal to the first outer cross-sectional dimension of said first light guiding fibre portion;
  said first light guiding fibre portion comprising a Mode Field Diameter, MFD, defining a first optical field diameter of light at the first end of the solid fibre portion when light is transmitted from the first light guiding fibre portion to the solid fibre portion, and the transmitted light comprising a second optical field diameter when reaching the second end of the solid fibre portion; and
  said solid fibre portion being dimensioned so that the second optical field diameter is smaller than or equal to a cross-sectional diameter or smallest cross-sectional dimension of the second end of the solid fibre portion.

17. A method of producing a sealed microstructured optical fibre, the fibre comprising a first light guiding optical fibre portion comprising a cladding region with a plurality of spaced apart cladding voids extending longitudinally in the fibre axial direction and a core region bounded by said cladding region, the first light guiding fibre portion comprising an end with an end surface and a first outer cross-sectional dimension, the method comprising:
  forming or arranging a solid light transparent fibre portion at said end of the first light guiding fibre portion so as to provide a hermetic sealing of said cladding voids, said solid fibre portion comprising a second outer cross-sectional dimension and further comprising a first end facing the first light guiding fibre portion by being attached thereto or by sharing a common solid background material, and a second end opposite said first light guiding fibre portion;
  arranging said solid fibre portion so that when light is transmitted from the first light guiding fibre portion to the solid fibre portion, the light enters the solid fibre portion via the first end and leaves the solid fibre portion via the second end;
  said second outer cross-sectional dimension of said solid fibre portion being substantially equal to the first outer cross-sectional dimension of said first light guiding fibre portion; and
  said solid fibre portion being dimensioned so that a cross sectional dimension of the second end of the solid fibre portion is smaller than the largest cross-sectional dimension of the first fibre portion.

18. A method of producing a sealed microstructured optical fibre, the fibre comprising a first light guiding optical fibre portion comprising a cladding region with a plurality of spaced apart cladding voids extending longitudinally in the fibre axial direction and a core region bounded by said cladding region, the first light guiding fibre portion comprising an end with an end surface and a first outer cross-sectional dimension, the method comprising:
  forming or arranging a solid light transparent fibre portion at said end of the first light guiding fibre portion so as to provide a hermetic sealing of said cladding voids, said solid fibre portion comprising a second outer cross-sectional dimension;
  said second outer cross-sectional dimension of said solid fibre portion being substantially equal to the first outer cross-sectional dimension of said first light guiding fibre portion; and
  said core region of the first fibre portion comprising one core void or a plurality of spaced apart core voids extending longitudinally in the fibre axial direction, said method further comprising hermetically sealing the core void(s) by the formation or arrangement of the solid light transparent fibre portion.

19. The method according to claim 18, wherein the core region of the first fibre portion has an effective refractive index being larger than an effective refractive index of the cladding region for a guided wavelength of light in a range of 400-1700 nm.

20. The method according to claim 18, wherein the core region of the first fibre portion has an effective refractive index being smaller than an effective refractive index of the cladding region for a guided wavelength of light in a range of 400-1700 nm.

21. The method according to claim 18, wherein the core voids contain air, another gas or vacuum.

22. The method according to claim 18, wherein the core voids are air holes or capillary air holes.

23. A method of producing a sealed microstructured optical fibre, the fibre comprising a first light guiding optical fibre portion comprising a cladding region with a plurality of spaced apart cladding voids extending longitudinally in the fibre axial direction and a core region bounded by said cladding region, the first light guiding fibre portion comprising an end with an end surface and a first outer cross-sectional dimension, the method comprising:

forming a solid light transparent fibre portion at said end of the first light guiding fibre portion by heating an end portion of the first light guiding fibre portion so as to collapse or close the cladding voids within said end portion to thereby obtain a hermetic sealing of said cladding voids, said solid fibre portion comprising a second outer cross-sectional dimension;

cleaving the end portion of the first fibre portion before said heating process, whereby an end face of the formed solid fibre portion obtains an outwardly curving surface during said heating process; and said second outer cross-sectional dimension of said solid fibre portion being substantially equal to the first outer cross-sectional dimension of said first light guiding fibre portion.

24. The method according to claim 23, wherein the heating process is performed so that the resulting solid fibre portion has a predetermined length.

25. A method of producing a sealed microstructured optical fibre, the fibre comprising a first light guiding optical fibre portion comprising a cladding region with a plurality of spaced apart cladding voids extending longitudinally in the fibre axial direction and a core region bounded by said cladding region, the first light guiding fibre portion comprising an end with an end surface and a first outer cross-sectional dimension, the method comprising:

forming or arranging a solid light transparent fibre portion at said end of the first light guiding fibre portion so as to provide a hermetic sealing of said cladding voids, said solid fibre portion comprising a second outer cross-sectional dimension and further comprising a first end facing the first light guiding fibre portion by being attached thereto or by sharing a common solid background material, and a second end opposite said first light guiding fibre portion;

arranging said solid fibre portion so that when light is transmitted from the first light guiding fibre portion to the solid fibre portion, the light enters the solid fibre portion via the first end and leaves the solid fibre portion via the second end;

said second outer cross-sectional dimension of said solid fibre portion being substantially equal to the first outer cross-sectional dimension of said first light guiding fibre portion;

said first light guiding fibre portion comprising a Mode Field Diameter, MFD, defining a first optical field diameter of light at the first end of the solid fibre portion when light is transmitted from the first light guiding fibre portion to the solid fibre portion, and the transmitted light comprising a second optical field diameter when reaching the second end of the solid fibre portion; and said solid fibre portion comprising a length smaller than the Rayleigh length, B, $B=(n*\pi*(MFD/2)^2)/\lambda_0$; where n is a refractive index of the solid fibre portion and $\lambda_0$ is a free-space optical wavelength of light transmitted through the fibre.

26. A method of producing a sealed microstructured optical fibre, the fibre comprising a first light guiding optical fibre portion comprising a cladding region with a plurality of spaced apart cladding voids extending longitudinally in the fibre axial direction and a core region bounded by said cladding region, the first light guiding fibre portion comprising an end with an end surface and a first outer cross-sectional dimension, the method comprising:

forming or arranging a solid light transparent fibre portion at said end of the first light guiding fibre portion so as to provide a hermetic sealing of said cladding voids, said solid fibre portion comprising a second outer cross-sectional dimension and further comprising a first end facing the first light guiding fibre portion by being attached thereto or by sharing a common solid background material, and a second end opposite said first light guiding fibre portion;

arranging said solid fibre portion so that when light is transmitted from the first light guiding fibre portion to the solid fibre portion, the light enters the solid fibre portion via the first end and leaves the solid fibre portion via the second end;

said second outer cross-sectional dimension of said solid fibre portion being substantially equal to the first outer cross-sectional dimension of said first light guiding fibre portion;

said first light guiding fibre portion comprising a Mode Field Diameter, MFD, defining a first optical field diameter of light at the first end of the solid fibre portion when light is transmitted from the first light guiding fibre portion to the solid fibre portion, and the transmitted light comprising a second optical field diameter when reaching the second end of the solid fibre portion; and said solid fibre portion comprising a length that is sufficiently short to provide the second optical field diameter with a size which is less than square-root 2 times MFD.

27. An optical fibre comprising an axial direction and a cross section perpendicular to said axial direction, said optical fibre comprising:

a first light guiding fibre portion comprising a cladding region with a plurality of spaced apart cladding voids extending longitudinally in the fibre axial direction and a core region bounded by said cladding region; and a solid light transparent fibre portion comprising a first end facing the first light guiding fibre portion by being attached thereto or by sharing a common solid background material, and a second end forming an end face of the optical fibre, said solid light transparent fibre portion providing a hermetic sealing of the cladding voids of the first light guiding fibre portion;

said first light guiding fibre portion comprising a Mode Field Diameter, MFD, defining a first optical field diameter of light at the first end of the solid fibre portion when light is transmitted from the first light guiding fibre portion to the solid fibre portion, and the transmitted light comprising a second optical field diameter when reaching the second end of the solid fibre portion, said solid fibre portion being smaller than or equal to 2 mm in length from the first end to the second end;

said fibre comprising at least two types of voids sealed off in at least two different positions in a longitudinal direction of the fibre, said voids comprising outer voids in an outer cladding region and inner voids in an inner cladding, said outer voids being larger than said inner voids, said outer voids being sealed off at a distance, D2, away from an end facet of the fibre, and said inner voids being sealed off at a distance D1+D2, away from an end-facet of the fibre.

28. The optical fibre according to claim 27, wherein D2 is smaller than 100 μm.

29. The optical fibre according to claim 27, wherein D1 is larger than 500 μm.

* * * * *